US010980045B2

(12) United States Patent
Chen et al.

(10) Patent No.: US 10,980,045 B2
(45) Date of Patent: Apr. 13, 2021

(54) TECHNIQUES FOR MANAGING POWER ON AN UPLINK COMPONENT CARRIER TRANSMITTED OVER A SHARED RADIO FREQUENCY SPECTRUM BAND

(71) Applicant: QUALCOMM Incorporated, San Diego, CA (US)

(72) Inventors: Wanshi Chen, San Diego, CA (US); Aleksandar Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 179 days.

(21) Appl. No.: 14/858,688

(22) Filed: Sep. 18, 2015

(65) Prior Publication Data
US 2016/0100420 A1 Apr. 7, 2016

Related U.S. Application Data

(60) Provisional application No. 62/058,823, filed on Oct. 2, 2014.

(51) Int. Cl.
H04W 72/12 (2009.01)
H04W 52/34 (2009.01)
(Continued)

(52) U.S. Cl.
CPC ....... H04W 72/1268 (2013.01); H04W 16/14 (2013.01); H04W 52/325 (2013.01);
(Continued)

(58) Field of Classification Search
CPC . H04W 52/346; H04W 52/367; H04W 52/54; H04W 72/0473
(Continued)

(56) References Cited

U.S. PATENT DOCUMENTS 7,146,176 B2 * 12/2006 McHenry .............. H04W 16/14
455/454
8,023,955 B2 9/2011 Anderson
(Continued)

FOREIGN PATENT DOCUMENTS

EP 2916598 A1 9/2015
EP 2940956 A1 11/2015
(Continued)

OTHER PUBLICATIONS

ISA/EPO, Partial International Search Report of the International Searching Authority, Int'l. App. No. PCT/US2015/051162, dated Nov. 27, 2015, European Patent Office, Rijswijk, NL, 8 pgs.
(Continued)

Primary Examiner — Parth Patel
Assistant Examiner — Berhanu D Belete
(74) Attorney, Agent, or Firm — Dalei Dong

(57) ABSTRACT

Techniques are described for wireless communication. A first method includes identifying a first uplink component carrier of a plurality of component carriers configured for a user equipment (UE); determining that the first uplink component carrier is transmitted over a shared radio frequency spectrum band; and performing a power management operation on the first uplink component carrier, for a current subframe, based at least in part on the determining.

30 Claims, 14 Drawing Sheets

(51) Int. Cl.
*H04W 76/15* (2018.01)
*H04W 52/32* (2009.01)
*H04W 52/36* (2009.01)
*H04W 16/14* (2009.01)
*H04W 72/04* (2009.01)
*H04W 52/28* (2009.01)
*H04W 52/14* (2009.01)
*H04W 52/44* (2009.01)
*H04W 88/06* (2009.01)

(52) U.S. Cl.
CPC ......... *H04W 52/34* (2013.01); *H04W 52/346* (2013.01); *H04W 52/367* (2013.01); *H04W 72/0413* (2013.01); *H04W 76/15* (2018.02); *H04W 52/146* (2013.01); *H04W 52/281* (2013.01); *H04W 52/44* (2013.01); *H04W 88/06* (2013.01)

(58) Field of Classification Search
USPC ....................................................... 370/329
See application file for complete search history.

(56) References Cited

U.S. PATENT DOCUMENTS

| | | | | |
|---|---|---|---|---|
| 8,676,264 | B2* | 3/2014 | Yao | H04L 27/0008 455/561 |
| 8,688,163 | B2 | 4/2014 | Chen et al. | |
| 9,084,209 | B2* | 7/2015 | Gaal | H04W 52/365 |
| 9,113,491 | B2 | 8/2015 | Montojo et al. | |
| 9,661,588 | B2* | 5/2017 | Takaoka | H04W 52/42 |
| 10,136,417 | B2* | 11/2018 | Gauvreau | H04L 1/1861 |
| 2009/0197632 | A1* | 8/2009 | Ghosh | H04W 52/34 455/522 |
| 2011/0081936 | A1* | 4/2011 | Haim | H04W 52/367 455/522 |
| 2011/0105173 | A1* | 5/2011 | Haim | H04W 52/325 455/522 |
| 2011/0128895 | A1* | 6/2011 | Sadek | H04W 16/14 370/280 |
| 2011/0310759 | A1* | 12/2011 | Gerstenberger | H04L 5/001 370/252 |
| 2012/0115537 | A1* | 5/2012 | Gaal | H04W 52/146 455/522 |
| 2012/0115547 | A1* | 5/2012 | Yao | H04W 52/34 455/561 |
| 2012/0188947 | A1* | 7/2012 | Larsson | H04W 52/146 370/328 |
| 2012/0188949 | A1* | 7/2012 | Salkintzis | H04L 45/308 370/329 |
| 2012/0263060 | A1* | 10/2012 | Suzuki | H04W 52/365 370/252 |
| 2013/0044621 | A1* | 2/2013 | Jung | H04W 72/082 370/252 |
| 2013/0058315 | A1* | 3/2013 | Feuersanger | H04W 52/281 370/336 |
| 2013/0077596 | A1* | 3/2013 | Liang | H04L 5/001 370/329 |
| 2013/0114505 | A1* | 5/2013 | Haim | H04W 52/146 370/328 |
| 2013/0121264 | A1* | 5/2013 | Heo | H04W 52/346 370/329 |
| 2013/0203458 | A1 | 8/2013 | Charbit et al. | |
| 2013/0208587 | A1* | 8/2013 | Bala | H04W 16/14 370/230 |
| 2013/0215811 | A1* | 8/2013 | Takaoka | H04W 52/367 370/311 |
| 2013/0272259 | A1* | 10/2013 | Kim | H04L 5/001 370/329 |
| 2014/0003356 | A1* | 1/2014 | Wang | H04W 72/1289 370/329 |
| 2014/0010182 | A1* | 1/2014 | Chunli | H04L 5/0048 370/329 |
| 2014/0071862 | A1 | 3/2014 | Ji et al. | |
| 2014/0155116 | A1* | 6/2014 | Dakshinamurthy | H04W 52/0251 455/522 |
| 2014/0321392 | A1* | 10/2014 | Li | H04W 52/325 370/329 |
| 2014/0362814 | A1* | 12/2014 | Haim | H04W 52/30 370/329 |
| 2015/0031410 | A1* | 1/2015 | Lim | H04W 52/146 455/522 |
| 2015/0036566 | A1* | 2/2015 | Blankenship | H04W 52/281 370/311 |
| 2015/0036605 | A1* | 2/2015 | Kim | H04W 52/146 370/329 |
| 2015/0043413 | A1* | 2/2015 | Haim | H04W 52/32 370/311 |
| 2015/0133179 | A1* | 5/2015 | Li | H04W 52/146 455/522 |
| 2015/0180619 | A1* | 6/2015 | Majjigi | H04W 72/0446 370/330 |
| 2015/0188592 | A1* | 7/2015 | Solondz | H04B 1/18 455/501 |
| 2015/0201412 | A1* | 7/2015 | Suzuki | H04W 52/365 370/329 |
| 2015/0223069 | A1* | 8/2015 | Solondz | H04W 16/14 370/329 |
| 2015/0230206 | A1* | 8/2015 | Tabet | H04W 72/02 370/329 |
| 2015/0257007 | A1* | 9/2015 | Solondz | H04L 9/3234 713/154 |
| 2015/0289141 | A1* | 10/2015 | Ghasemzadeh | H04W 16/14 370/330 |
| 2015/0319753 | A1* | 11/2015 | Chen | H04L 5/001 370/277 |
| 2015/0326463 | A1* | 11/2015 | Solondz | H04L 43/0829 370/252 |
| 2016/0021618 | A1* | 1/2016 | Yin | H04W 52/146 370/280 |
| 2016/0135193 | A1* | 5/2016 | Zhang | H04W 52/04 370/329 |
| 2016/0192379 | A1* | 6/2016 | Behravan | H04W 72/04 370/329 |
| 2016/0286449 | A1* | 9/2016 | Choi | H04W 36/18 |
| 2016/0309464 | A1* | 10/2016 | Mukherjee | H04W 28/06 |
| 2016/0330693 | A1* | 11/2016 | Hwang | H04W 52/146 |
| 2017/0202025 | A1* | 7/2017 | Ouchi | H04W 74/0833 |
| 2017/0251497 | A1* | 8/2017 | Larsson | H04W 16/14 |
| 2017/0311320 | A1* | 10/2017 | Lunttila | H04L 5/001 |
| 2017/0339647 | A1* | 11/2017 | Shao | H04W 52/367 |
| 2019/0349865 | A1* | 11/2019 | Hwang | H04L 5/0048 |

FOREIGN PATENT DOCUMENTS

| | | |
|---|---|---|
| JP | 2012517747 A | 8/2012 |
| JP | 2014503140 A | 2/2014 |
| JP | 2014093628 A | 5/2014 |
| JP | 2014522212 A | 8/2014 |
| WO | WO-2010091425 A2 | 8/2010 |
| WO | WO-2011011636 A2 | 1/2011 |
| WO | WO-2011082105 A2 | 7/2011 |
| WO | WO-2013025562 A2 | 2/2013 |
| WO | WO-2013115510 A1 | 8/2013 |
| WO | WO-2014069085 A1 | 5/2014 |
| WO | WO-2014113626 A2 | 7/2014 |
| WO | WO-2014117335 A1 | 8/2014 |

OTHER PUBLICATIONS

ISA/EPO, International Search Report and Written Opinion of the International Searching Authority, Int'l. App. No. PCT/US2015/051162, dated Jan. 29, 2016, European Patent Office, Rijswijk, NL, 29 pgs.
NTT Docomo, "Details of Guaranteed Power PMeNB and PSeNB," 3GPP TSG RAN WG1 Meeting #78, R1-143221, Dresden Germany, Aug. 18-22, 2014, 6 pgs., 3rd Generation Partnership Project.

(56) References Cited

OTHER PUBLICATIONS

Sharp, "UL Power Allocation for Dual Connectivity," 3GPP TSG RAN WG1 Meeting #78, R1-143124, Dresden, Germany, Aug. 18-22, 2014, 8 pgs., 3rd Generation Partnership Project.

* cited by examiner

TECHNIQUES FOR MANAGING POWER ON AN UPLINK COMPONENT CARRIER TRANSMITTED OVER A SHARED RADIO FREQUENCY SPECTRUM BAND

CROSS REFERENCES

The present application for patent claims priority to U.S. Provisional Patent Application No. 62/058,823 by Chen et al., titled "Techniques for Managing Power on an Uplink Component Carrier Transmitted Over a Shared Radio Frequency Spectrum Band," filed Oct. 2, 2014, assigned to the assignee hereof, which is hereby incorporated by reference in its entirety.

BACKGROUND

Field of the Disclosure

The present disclosure, for example, relates to wireless communication systems, and more specifically to techniques for managing power on an uplink component carrier transmitted over a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications between a base station and a UE over a shared radio frequency spectrum band, or over different radio frequency spectrum bands (e.g., a licensed radio frequency spectrum band or a shared radio frequency spectrum band) of a cellular network. With increasing data traffic in cellular networks that use a licensed radio frequency spectrum band, offloading of at least some data traffic to a shared radio frequency spectrum band may provide a cellular operator with opportunities for enhanced data transmission capacity. A shared radio frequency spectrum band may also provide service in areas where access to a licensed radio frequency spectrum band is unavailable.

Prior to gaining access to, and communicating over, a shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the shared radio frequency spectrum band is available. When it is determined that the channel of the shared radio frequency spectrum band is available, a channel usage beacon signal (CUBS) may be transmitted to reserve the channel.

In some modes of operation, a UE may operate in a carrier aggregation mode or dual-connectivity mode, in which the UE may be configured to communicate with one or more base stations using a plurality of component carriers. When communicating using two or more component carriers, a UE may be allocated a transmit power per component carrier, as well as a total transmit power (e.g., a maximum transmit power for the combination of component carriers in use). At times, the sum of transmit powers of the various component carriers in use by the UE may exceed the total transmit power. In these cases, the UE may employ power scaling to bring the sum of transmit powers of the various component carriers to within the total transmit power.

SUMMARY

The present disclosure, for example, relates to one or more techniques for managing power on an uplink component carrier transmitted over a shared radio frequency spectrum band. Because the process of contending for access to a shared radio frequency spectrum band is uncertain (e.g., winning access to the shared radio frequency spectrum band may not occur on a first attempt, or in every subframe in which contention for access is attempted), it is useful to maintain access to the shared radio frequency spectrum band as long as possible when there are transmissions to be made. However, power management operations (e.g., power scaling techniques) that have been designed for use on uplink component carriers transmitted over a licensed radio frequency spectrum band when operating in a carrier aggregation mode can result in a power reduction so significant that a transmission on a component carrier is dropped. When a transmission is dropped, another transmitting apparatus may contend for access to the shared radio frequency spectrum band and gain access thereto, and prohibit the transmitting apparatus that dropped the transmission from regaining access to the shared radio frequency spectrum band. Power management operations that have been designed for use on uplink component carriers transmitted over a licensed radio frequency spectrum band when operating in a carrier aggregation mode can also result in fluctuations in transmit power from one subframe to another subframe, which can be undesirable when transmitting over a shared radio frequency spectrum band.

In an example, a method for wireless communication is described. In one example, the method includes determining whether a first uplink component carrier of a plurality of component carriers is configured for a UE; determining that the first uplink component carrier is transmitted over a shared radio frequency spectrum band; and performing a power management operation on the first uplink component carrier, for a current subframe, based at least in part on the determining.

In some examples of the method, performing the power management operation may include maintaining a transmit power on the first uplink component carrier at or above a minimum guaranteed power. In some examples, the minimum guaranteed power may depend on a channel type or uplink information type transmitted on the first uplink component carrier. In some examples, the method may include scheduling at least one of a physical uplink control channel (PUCCH) or a physical uplink shared channel (PUSCH) on the first uplink component carrier during the current subframe. In some examples, the minimum guaranteed power may include at least one of a PUCCH minimum guaranteed power component and a PUSCH minimum guaranteed power component, and the PUCCH minimum guaranteed power component may be greater than the PUSCH minimum guaranteed power component.

In some examples of the method, performing the power management operation may include scaling a transmit power on the first uplink component carrier to a reduced power for the current subframe. In some examples, the method may include using the reduced power as a maximum transmit power on the first uplink component carrier for at least one subsequent subframe following the current subframe. In some examples, the at least one subsequent subframe may include at least one uplink subframe between the current subframe and a boundary of a subsequent frame. In some examples, the method may include dropping a transmission on the first uplink component carrier for at least one of a number of uplink subframes between the current subframe and a boundary of a subsequent frame. In some examples, the scaling may surpass a threshold power reduction, and the method may include dropping a transmission on the first uplink component carrier for at least one of a number of uplink subframes between the current subframe and a boundary of a subsequent frame.

In some examples of the method, performing the power management operation may include using a transmit power on the first uplink component carrier during a subframe preceding the current subframe. The transmit power may be a maximum transmit power on the first uplink component carrier for the current subframe.

In some examples of the method, performing the power management operation may include dropping a transmission on the first uplink component carrier for the current subframe. In some examples, the method may include dropping a transmission on the first uplink component carrier for at least one of a number of uplink subframes between the current subframe and a boundary of a subsequent frame. In some examples, the method may include dropping a transmission on the first uplink component carrier for at least one of a number of uplink subframes between the current subframe and a boundary of a subsequent frame. In some examples, the method may include performing a CCA for the shared radio frequency spectrum band. The CCA may be performed for at least one subsequent uplink subframe following the current subframe.

In some examples, the method may include receiving a first uplink scheduling for the first uplink component carrier for the current subframe, and receiving a second uplink scheduling for the first uplink component carrier for the current subframe. In some examples, the method may include using the second uplink scheduling based at least in part on performing the power management operation. In some examples, the method may include using the first uplink scheduling or the second uplink scheduling based at least in part on a condition of the power management operation. In some examples, performing the power management operation may include scaling the transmit power on the first uplink component carrier to a reduced power for the current subframe, using the first uplink scheduling when the scaling does not surpass a threshold power reduction, and using the second uplink scheduling when the scaling surpasses the threshold power reduction.

In some examples of the method, the plurality of component carriers may include a second uplink component carrier transmitted over the shared radio frequency spectrum band. In some examples of the method, the plurality of component carriers may include a second uplink component carrier transmitted over a licensed radio frequency spectrum band. In some examples of the method, the plurality of component carriers may be configured for a carrier aggregation operation for the UE. In some examples of the method, the plurality of component carriers may be configured for a dual-connectivity operation for the UE.

In an example, an apparatus for wireless communication is described. In one example, the apparatus may include means for identifying a first uplink component carrier of a plurality of component carriers configured for a UE; means for determining that the first uplink component carrier is transmitted over a shared radio frequency spectrum band; and means for performing a power management operation on the first uplink component carrier, for a current subframe, based at least in part on the determining.

In an example, another apparatus for wireless communication is described. In one example, the apparatus may include a processor and memory in electronic communication with the processor. The processor and the memory may be configured to identify a first uplink component carrier of a plurality of component carriers configured for a UE; determine that the first uplink component carrier is transmitted over a shared radio frequency spectrum band; and perform a power management operation on the first uplink component carrier, for a current subframe, based at least in part on the determining.

In some examples, the apparatus may maintain transmit power on the first uplink component. In some examples, the minimum guaranteed power depends on a channel type or uplink information type transmitted on the first uplink component carrier. In some examples, the apparatus may scale a transmit power on the first uplink component carrier to a reduced power for the current subframe. In some examples, the apparatus may use the reduced power as a maximum transmit power on the first uplink component carrier for at least one subsequent subframe following the current subframe.

In an example, a non-transitory computer-readable medium storing computer-executable code for wireless communication is described. In one example, the code may be executable by a processor to identify a first uplink component carrier of a plurality of component carriers configured for a UE; determine that the first uplink component carrier is transmitted over a shared radio frequency spectrum band; and perform a power management operation on the first uplink component carrier, for a current subframe, based at least in part on the determining. In some examples, the code may also be used to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
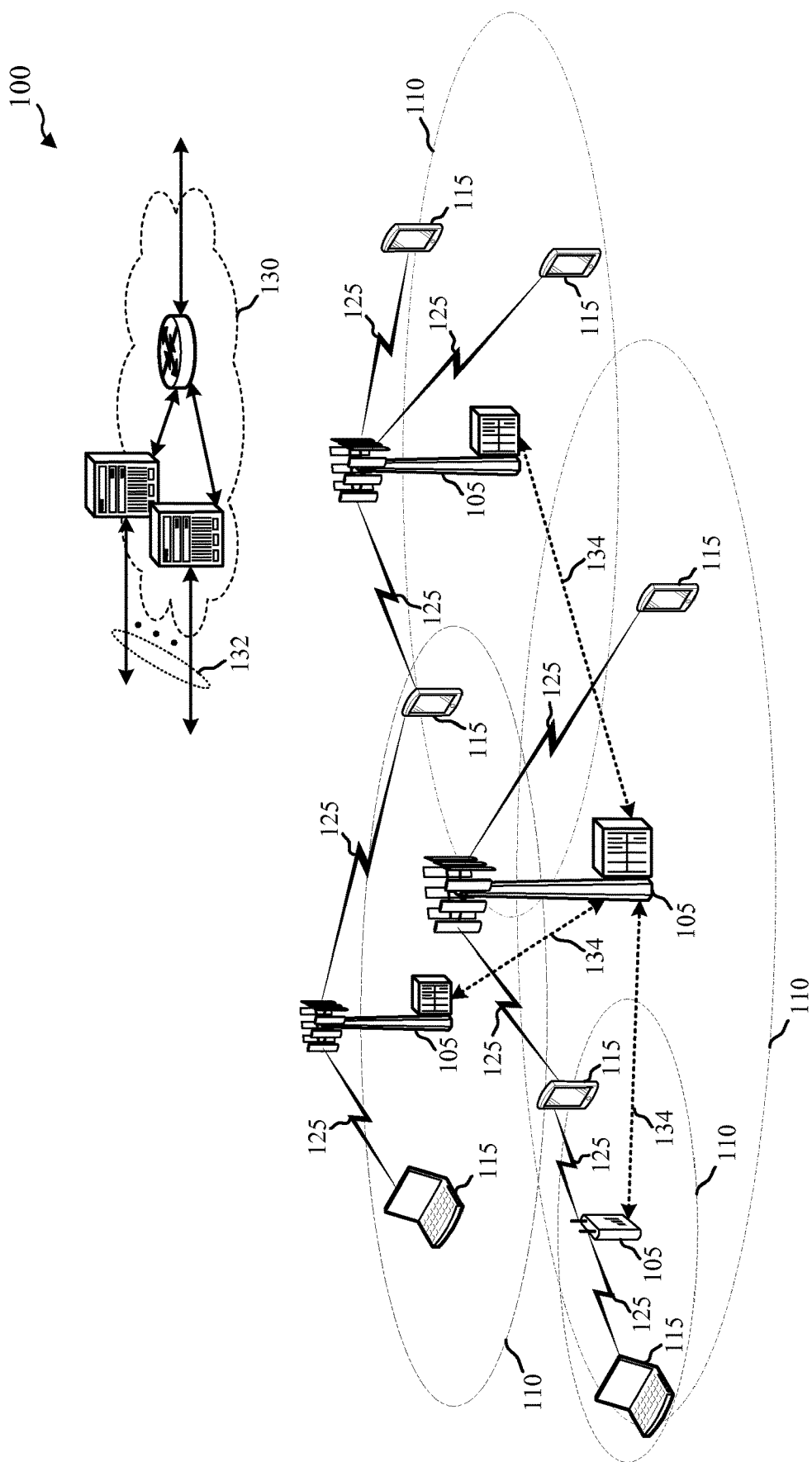
FIG. 1 illustrates an example of a wireless communication system, in accordance with various aspects of the present disclosure.

Techniques are described in which a shared radio frequency spectrum band is used for at least a portion of communications over a wireless communication system. In some examples, the shared radio frequency spectrum band may be used for Long Term Evolution (LTE) communications or LTE-Advanced (LTE-A) communications. The shared radio frequency spectrum band may be used in combination with, or independent from, a licensed radio frequency spectrum band. In some examples, the shared radio frequency spectrum band may be a radio frequency spectrum band for which a device may need to contend for access because the radio frequency spectrum band is available, at least in part, for unlicensed use, such as Wi-Fi use.

With increasing data traffic in cellular networks that use a licensed radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a licensed radio frequency spectrum band is unavailable. As noted above, before communicating over a shared radio frequency spectrum band, transmitting apparatuses may perform an LBT procedure to gain access to the medium. Such an LBT procedure may include performing a CCA procedure (or extended CCA procedure) to determine whether a channel of the shared radio frequency spectrum band is available. When it is determined that the channel of the shared radio frequency spectrum band is available, a CUBS may be transmitted to reserve the channel. When it is determined that a channel is not available, a CCA procedure (or extended CCA procedure) may be performed for the channel again at a later time.

After winning contention for access to a shared radio frequency spectrum band, it may be desirable for a UE to maintain access to the shared radio frequency spectrum band for a duration of a prescribed time in which a transmission is to be made. When the UE loses access to the shared radio frequency spectrum band, there can be uncertainty as to when the UE may regain access to the shared radio frequency spectrum band. Power management operations currently used on uplink component carriers in an LTE/LTE-A network, when operating in a carrier aggregation mode, can sometimes result in a power scaling and/or other power management operation that leads to a transmission on an uplink component carrier being dropped. Because power scaling may be prioritized, with power preservation on an uplink component carrier carrying a physical uplink control channel (PUCCH) being given preference over power preservation on a component carrier carrying a physical uplink shared channel (PUSCH) with uplink control information (UCI), and with power preservation on an uplink component carrier carrying a PUSCH with UCI being given preference over power preservation on an uplink component carrier carrying a PUSCH without UCI, transmissions on some uplink component carriers are more at risk of being dropped than others. When operating in a dual-connectivity mode of operation over an LTE/LTE-A network, groups of component carriers associated with different base stations may be configured with respective minimum guaranteed transmit powers, with some amount of residual transmit power being sharable among the different groups of uplink component carriers. This can provide connectivity to each of the base stations. However, power scaling may once again be prioritized among individual component carriers, with power preservation on a component carrier carrying an acknowledgement (ACK), non-acknowledgement (NAK), or scheduling request (SR) being given preference over power preservation on an uplink component carrier carrying channel state information (CSI), and with power preservation on an uplink component carrier carrying CSI being given preference over power preservation on an uplink component that does not carry UCI. Again, transmissions on some uplink component carriers are more at risk of being dropped.

In an LTE/LTE-A network using a shared radio frequency spectrum band, it may be useful to mitigate the frequency of dropped transmissions, so that access to the shared radio frequency spectrum band does not have to be reacquired. It may also be useful to maintain a constant transmit power on the shared radio frequency spectrum band, and/or to change the transmit power on the shared radio frequency spectrum band in a controlled and steady manner.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. UL transmissions may also include transmissions of data, which data may be transmitted over a physical uplink shared channel (PUSCH) or enhanced PUSCH (ePUSCH). UL transmissions may also include the transmission of a sounding reference signal (SRS) or enhanced SRS (eSRS), a physical random access channel (PRACH) or enhanced PRACH (ePRACH) (e.g., in the standalone mode described with reference to FIG. 2 or the dual connectivity mode described with reference to FIG. 4), or a scheduling request (SR) or enhanced SR (eSR) (e.g., in the standalone mode described with reference to FIG. 2). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In an LTE/LTE-A network, a UE 115 may be configured to communicate using up to five component carriers when operating in a carrier aggregation mode or dual-connectivity mode. When communicating using two or more component carriers, a UE 115 may be allocated a transmit power per component carrier, as well as a total transmit power (e.g., a maximum transmit power for the combination of component carriers in use). At times, the sum of transmit powers of the various component carriers in use may exceed the total transmit power. In these cases, a UE 115 may employ power scaling to bring the sum of transmit powers of the various component carriers in use to within the total transmit power.

In some examples, the wireless communication system 100 may support operation over a licensed radio frequency spectrum band (e.g., a radio frequency spectrum band for which transmitting apparatuses may not contend for access because the radio frequency spectrum band is licensed to specific users for specific uses, such as a licensed radio frequency spectrum band usable for LTE/LTE-A communications) or a shared radio frequency spectrum band (e.g., a radio frequency spectrum band for which transmitting apparatuses may need to contend for access because the radio frequency spectrum band is available for unlicensed use, such as Wi-Fi use). Upon winning a contention for access to the shared radio frequency spectrum band, a transmitting apparatus (e.g., a base station 105 or UE 115) may transmit one or more CUBS over the shared radio frequency spectrum band. The CUBS may reserve the shared radio frequency spectrum by providing a detectable energy on the shared radio frequency spectrum band. The CUBS may also serve to identify the transmitting apparatus or serve to synchronize the transmitting apparatus and a receiving apparatus. In some examples, a CUBS transmission may commence at a symbol period boundary (e.g., an OFDM symbol period boundary). In other examples, a CUBS transmission may commence between symbol period boundaries. In these latter examples, the transmission of a portion of a CUBS, which portion of a CUBS has a length that is shorter than a full symbol period, may provide a non-orthogonal transmission that interferes with one or more transmissions on adjacent tones (e.g., one or more transmissions of other apparatuses on adjacent tones).

Figure 2:
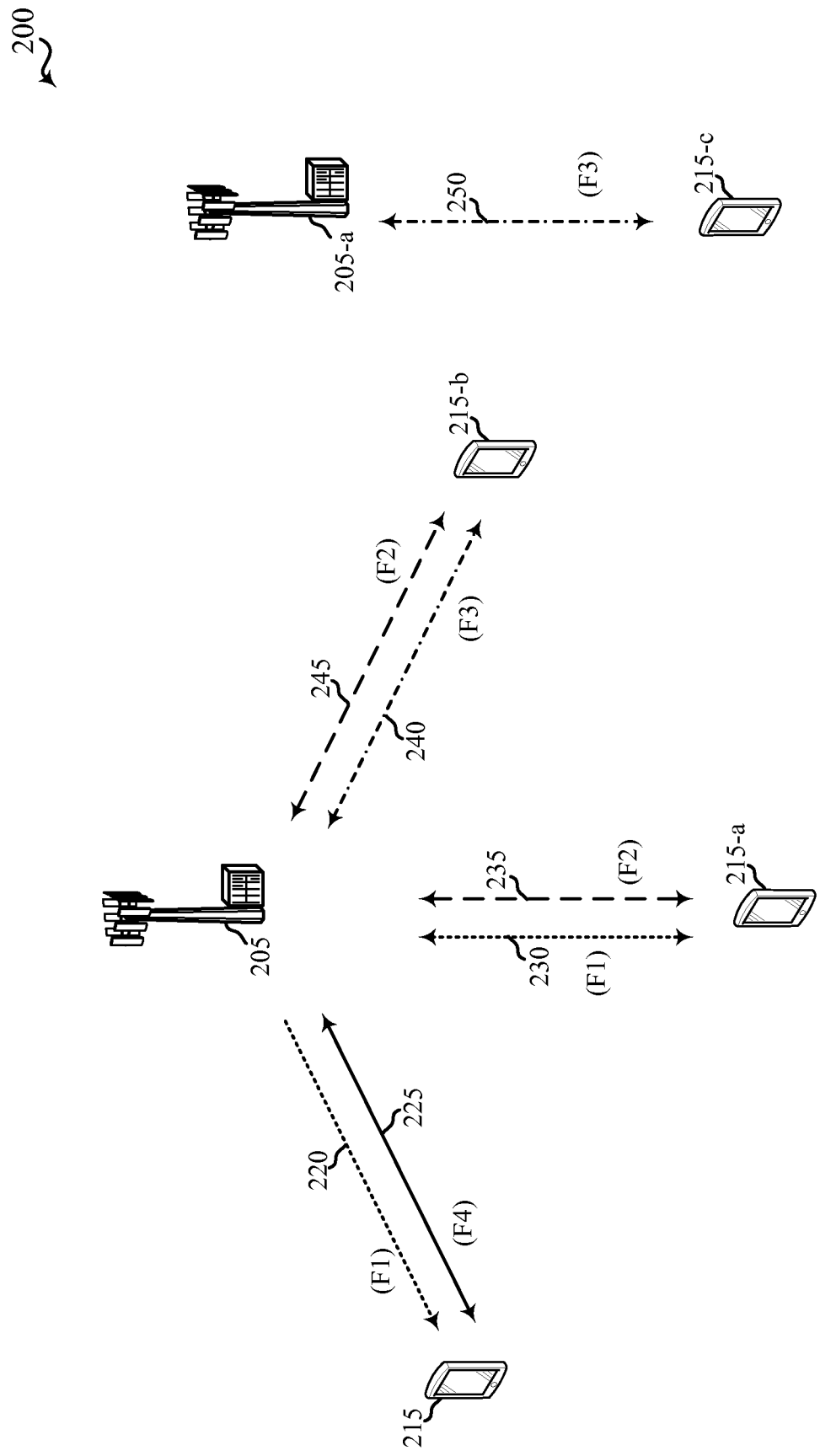
FIG. 2 shows a wireless communication system in which LTE/LTE-A may be deployed under different scenarios using a shared radio frequency spectrum band, in accordance with various aspects of the present disclosure.

FIG. 2 shows a wireless communication system 200 in which LTE/LTE-A may be deployed under different scenarios using a shared radio frequency spectrum band, in accordance with various aspects of the present disclosure. More specifically, FIG. 2 illustrates examples of a supplemental downlink mode (also referred to as a shared downlink mode), a carrier aggregation mode, and a standalone mode in which LTE/LTE-A is deployed using a shared radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the shared radio frequency spectrum band and the first bidirectional link 225 in the licensed radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum and needs to relieve some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the shared radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the shared radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and use a shared radio frequency spectrum band for capacity offload.

As described above, one type of service provider that may benefit from the capacity offload offered by using LTE/LTE-A in a shared radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the shared radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the shared radio frequency spectrum band (e.g., via second bidirectional link 230 and fourth bidirectional link 240). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, or resource block interleaved FDMA waveforms from the fourth UE 215-c using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

Figure 3:
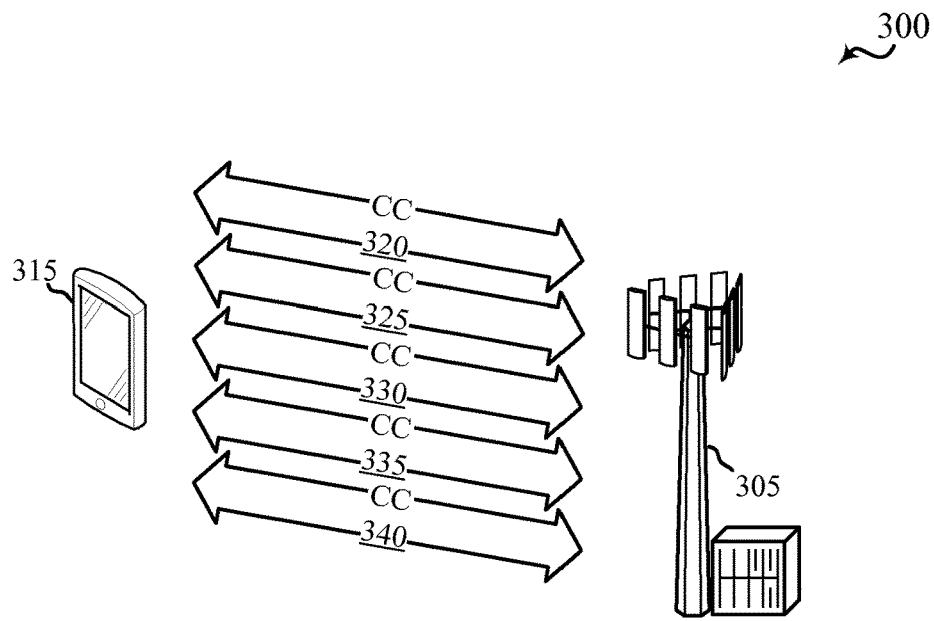
FIG. 3 shows a wireless communication system in which LTE/LTE-A may be deployed in a carrier aggregation scenario, in accordance with various aspects of the present disclosure.

FIG. 3 shows a wireless communication system 300 in which LTE/LTE-A may be deployed in a carrier aggregation scenario, in accordance with various aspects of the present disclosure. The wireless communication system 300 may be an example of portions of the wireless communication system 100 or 200 described with reference to FIG. 1 or 2. Moreover, a base station 305 may be an example of aspects of one or more of the base stations 105, 204, or 205-a described with reference to FIG. 1 or 2, while a UE 315 may be an examples of aspects of one or more of the UEs 115, 215, 215-a, 215-b, or 215-c described with reference to FIG. 1 or 2.

When communicating in a carrier aggregation mode using LTE/LTE-A communications, the UE 315 may communicate with the base station 305 using up to five component carriers. One of the component carriers may be designated as a primary component carrier, and the remaining component carriers may be designated as secondary component carriers. Each component carrier may be configured as a downlink component carrier, an uplink component carrier, or a cell (e.g., a component carrier that may be configured for use as a downlink component carrier and/or an uplink component carrier). By way of example, FIG. 3 illustrates communication between the UE 315 and the base station 305 over five component carriers, including a first downlink component carrier 320, a second downlink component carrier 325, a third downlink component carrier 330, a first uplink component carrier 335, and a second uplink component carrier 340. Each of the first downlink component carrier 320, the second downlink component carrier 325, the third downlink component carrier 330, the first uplink component carrier 335, and the second uplink component carrier 340 may operate in a licensed radio frequency spectrum band or a shared radio frequency spectrum band, depending on how the component carrier is allocated or configured.

When the UE 315 is configured for operation in a supplemental downlink mode of operation using a shared radio frequency spectrum band, as described with reference to FIG. 2, and when the UE 315 is operating in a carrier aggregation mode, one or more of the first downlink component carrier 320, the second downlink component carrier 325, and the third downlink component carrier 330 may operate in the licensed radio frequency spectrum band; one or more of the first downlink component carrier 320, the second downlink component carrier 325, and the third downlink component carrier 330 may operate in the shared radio frequency spectrum band; and the first uplink component carrier 335 and the second uplink component carrier 340 may operate in the licensed radio frequency spectrum band.

When the UE 315 is configured for operation in a carrier aggregation mode of operation using the shared radio frequency spectrum band, as described with reference to FIG. 2, one or more of the first downlink component carrier 320, the second downlink component carrier 325, and the third downlink component carrier 330 may operate in the licensed radio frequency spectrum band; one or more of the first downlink component carrier 320, the second downlink component carrier 325, and the third downlink component carrier 330 may operate in the shared radio frequency spectrum band; one or more of the first uplink component carrier 335 and the second uplink component carrier 340 may operate in the licensed radio frequency spectrum band; and one or more of the first uplink component carrier 335 and the second uplink component carrier 340 may operate in the shared radio frequency spectrum band. In some examples, all of the downlink component carriers may operate in the licensed radio frequency spectrum band, or all of the uplink component carriers may operate in the shared radio frequency spectrum band, but not all of the downlink component carriers and all of the uplink component carriers may operate in the shared radio frequency spectrum band (e.g., at least one downlink component carrier or at least one uplink component carrier operates in the licensed radio frequency spectrum band).

When the UE 315 is configured for operation in a stand-alone mode of operation using the shared radio frequency spectrum band, as described with reference to FIG. 2, and when the UE 315 is operating in a carrier aggregation mode, all of the first downlink component carrier 320, the second downlink component carrier 325, the third downlink component carrier 330, the first uplink component carrier 335, and the second uplink component carrier 340 may operate in the shared radio frequency spectrum band.

Figure 4:
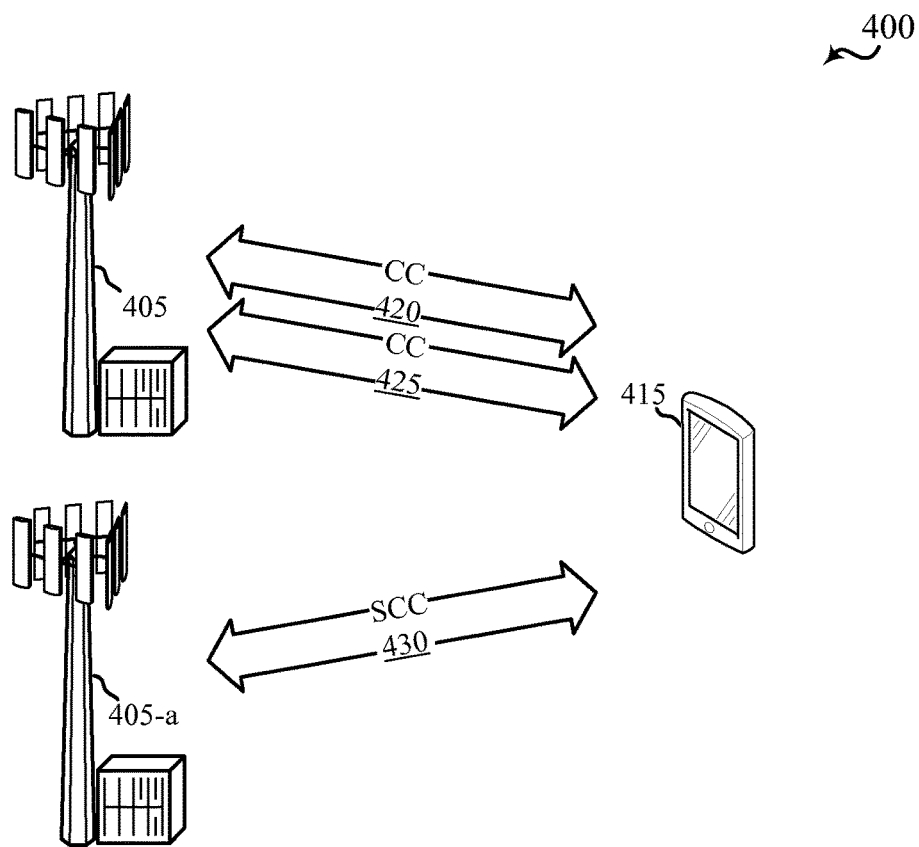
FIG. 4 shows a wireless communication system in which LTE/LTE-A may be deployed in a dual-connectivity scenario, in accordance with various aspects of the present disclosure.

FIG. 4 shows a wireless communication system 400 in which LTE/LTE-A may be deployed in a dual-connectivity scenario, in accordance with various aspects of the present disclosure. The wireless communication system 400 may be an example of portions of the wireless communication system 100, 200, or 300 described with reference to FIG. 1, 2, or 3. Moreover, a first base station 405 and a second base station 405-a may be examples of aspects of one or more of the base stations 105, 204, 205-a, or 305 described with reference to FIG. 1 or 2, while a UE 415 may be an examples of aspects of one or more of the UEs 115, 215, 215-a, 215-b, 215-c, or 315 described with reference to FIG. 1, 2, or 3.

When communicating in a dual-connectivity mode using LTE/LTE-A communications, the UE 415 may communicate with multiple base stations, such as the first base station 405 and the second base station 405-a, using up to five component carriers. One of the component carriers may be designated as a primary component carrier, and the remaining component carriers may be designated as secondary component carriers. Each component carrier may be configured as a downlink component carrier, an uplink component carrier, or a cell (e.g., a component carrier that may be configured for use as a downlink component carrier and/or an uplink component carrier). By way of example, FIG. 4 illustrates communication between the UE 415 and the base station 405 over three component carriers, including a first component carrier 420, a second component carrier 425, and a third component carrier 430. The first component carrier 420, the second component carrier 425, and the third component carrier 430 may be configured for various modes of operation using a licensed radio frequency spectrum band or a shared radio frequency spectrum band, similarly to how component carriers may be used in a carrier aggregation mode of operation, as described, for example, with reference to FIG. 3.

In some examples, a transmitting apparatus such as one of the base stations 105, 205, 205-a, 305, 405, or 405-a described with reference to FIG. 1, 2, 3, or 4, or one of the UEs 115, 215, 215-a, 215-b, 215-c, 315, or 415 described with reference to FIG. 1, 2, 3, or 4, may use a gating interval to gain access to a channel of a shared radio frequency spectrum band (e.g., to a physical channel of the shared radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 5:
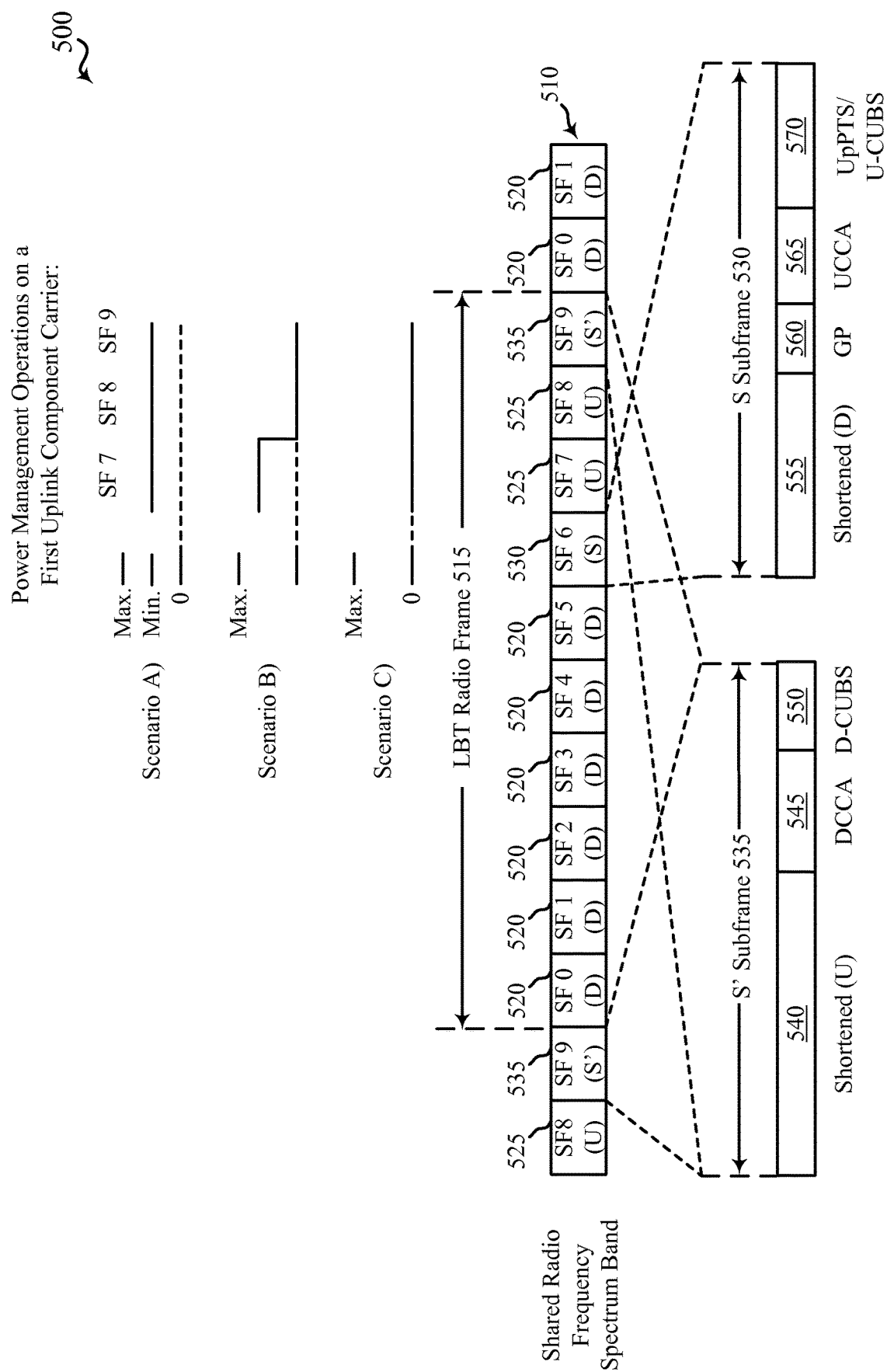
FIG. 5 shows an example of a wireless communication over a shared radio frequency spectrum band, in accordance with various aspects of the present disclosure.

FIG. 5 shows an example 500 of a wireless communication 510 over a shared radio frequency spectrum band, in accordance with various aspects of the present disclosure. In some examples, the wireless communication 510 may include a transmission of one or more uplink component carriers, which uplink component carrier(s) may be transmitted, for example, as part of a transmission made according to the supplemental downlink mode, the carrier aggregation mode, or the standalone mode described with reference to FIG. 2, the carrier aggregation mode described with reference to FIG. 3, and/or the dual-connectivity mode described with referenced to FIG. 4.

In some examples, an LBT radio frame 515 of the wireless communication 510 may have a duration of ten milliseconds and include a number of downlink (D) subframes 520, a number of uplink (U) subframes 525, and two types of special subframes, an S subframe 530 and an S' subframe 535. The S subframe 530 may provide a transition between downlink subframes 520 and uplink subframes 525, while the S' subframe 535 may provide a transition between uplink subframes 525 and downlink subframes 520 and, in some examples, a transition between LBT radio frames.

During the S' subframe 535, a downlink clear channel assessment (DCCA) procedure 545 may be performed by one or more base stations, such as one or more of the base stations 105, 205, or 205-a described with reference to FIG. 1 or 2, to reserve, for a period of time, a channel of the shared radio frequency spectrum band over which the wireless communication 510 occurs. Following a successful DCCA procedure 545 by a base station, the base station may transmit a channel usage beacon signal (CUBS) (e.g., a downlink CUBS (D-CUBS 550)) to provide an indication to other base stations or apparatuses (e.g., UEs, Wi-Fi access points, etc.) that the base station has reserved the channel. In some examples, a D-CUBS 550 may be transmitted using a plurality of interleaved resource blocks. Transmitting a D-CUBS 550 in this manner may enable the D-CUBS 550 to occupy at least some percentage of the available frequency bandwidth of the shared radio frequency spectrum band and satisfy one or more regulatory requirements (e.g., a requirement that transmissions over the shared radio frequency spectrum band occupy at least 80% of the available frequency bandwidth). The D-CUBS 550 may in some examples take a form similar to that of an LTE/LTE-A CRS or a channel state information reference signal (CSI-RS). When the DCCA procedure 545 fails, the D-CUBS 550 may not be transmitted.

The S' subframe 535 may include a plurality of OFDM symbol periods (e.g., 14 OFDM symbol periods). A first portion of the S' subframe 535 may be used by a number of UEs as a shortened uplink (U) period. A second portion of the S' subframe 535 may be used for the DCCA procedure 545. A third portion of the S' subframe 535 may be used by one or more base stations that successfully contend for access to the channel of the shared radio frequency spectrum band to transmit the D-CUBS 550.

During the S subframe 530, an uplink CCA (UCCA) procedure 565 may be performed by one or more UEs, such as one or more of the UEs 115, 215, 215-a, 215-b, or 215-c described above with reference to FIG. 1 or 2, to reserve, for a period of time, the channel over which the wireless communication 510 occurs. Following a successful UCCA procedure 565 by a UE, the UE may transmit an uplink CUBS (U-CUBS 570) to provide an indication to other UEs or apparatuses (e.g., base stations, Wi-Fi access points, etc.) that the UE has reserved the channel. In some examples, a U-CUBS 570 may be transmitted using a plurality of interleaved resource blocks. Transmitting a U-CUBS 570 in this manner may enable the U-CUBS 570 to occupy at least some percentage of the available frequency bandwidth of the shared radio frequency spectrum band and satisfy one or more regulatory requirements (e.g., the requirement that transmissions over the shared radio frequency spectrum band occupy at least 80% of the available frequency bandwidth). The U-CUBS 570 may in some examples take a form similar to that of an LTE/LTE-A CRS or CSI-RS. When the UCCA procedure 565 fails, the U-CUBS 570 may not be transmitted.

The S subframe 530 may include a plurality of OFDM symbol periods (e.g., 14 OFDM symbol periods). A first portion of the S subframe 530 may be used by a number of base stations as a shortened downlink (D) period 555. A second portion of the S subframe 530 may be used as a guard period (GP) 560. A third portion of the S subframe 530 may be used for the UCCA procedure 565. A fourth portion of the S subframe 530 may be used by one or more UEs that successfully contend for access to the channel of the shared radio frequency spectrum band as an uplink pilot time slot (UpPTS) or to transmit the U-CUBS 570.

In some examples, the DCCA procedure 545 or the UCCA procedure 565 may include the performance of a single CCA procedure. In other examples, the DCCA procedure 545 or the UCCA procedure 565 may include the performance of an extended CCA procedure. The extended CCA procedure may include a random number of CCA procedures, and in some examples may include a plurality of CCA procedures.

When the wireless communication 510 includes a transmission of one or more uplink component carriers according to a carrier aggregation mode of operation, scenarios may arise in which a power management operation is performed. For example, when a plurality of uplink component carriers are configured for a UE during one of the uplink subframes SF 7, SF 8, or SF9 (or during an uplink portion (e.g., a U-CUBS portion) of the S subframe 530 (e.g., SF 6)), and when a sum of the transmit powers of the uplink component carriers surpasses a total transmit power allowed for the UE during a subframe, a power management operation may be performed to reduce the total transmit power of the uplink component carriers. In some examples, one or more or all of the uplink component carriers may be transmitted over a shared radio frequency spectrum band (e.g., as part of the wireless communication 510 described with reference to FIG. 5). In these examples, a power management operation may be performed on one of the uplink component carriers transmitted over the shared radio frequency spectrum band. By way of example, FIG. 5 illustrates three scenarios (e.g., Scenario A, Scenario B, and Scenario C) in which a power management operation is performed on a first uplink component carrier transmitted over a shared radio frequency spectrum band as part of the wireless communication 510.

With reference to Scenario A, a minimum guaranteed power (e.g., Min., a transmit power greater than zero) may be configured for the first uplink component carrier in each of uplink subframes 7, 8, and 9 (SF 7, SF 8, and SF 9). When a power management operation needs to be performed for subframe 7, the transmit power on the first uplink component carrier may be reduced (or scaled) to a reduced power. However, because of the minimum guaranteed power, the transmit power may not be reduced below the minimum guaranteed power. In some examples, the power management operation performed for subframe 7 may only affect the transmit power on the first uplink component carrier for subframe 7. In other examples, the power management operation preformed for subframe 7 may be carried over to at least one (or each) subsequent subframe (or subsequent uplink subframe) in the LBT radio frame 515. By way of example, Scenario A carries over the power management operation performed for subframe 7 to each of subframe 8 and subframe 9.

In a first variation of Scenario A, the power reduction on the first uplink component carrier in subframe 7 may provide a reduced power that remains above the minimum guaranteed power. In a second variation of Scenario A, a minimum guaranteed power may not be provided in one or more of subframes 7, 8, or 9. In a third variation of Scenario A, different subframes may be subject to different power limitation conditions because of different requested transmit powers. As an example, a first subframe may have a total requested power that is 3 dB over a maximum transmit power, while a second subframe may have a total requested power that is 5 dB over a maximum transmit power. In any of these variations, a power management operation may need to be performed on the first uplink component carrier for subframe 8 or subframe 9. In these examples, a further power reduction on the first uplink component carrier may be made in subframe 8 or subframe 9, with the reduced power in the prior subframe serving as a maximum transmit power for the subsequent subframe (e.g., the reduced power used in subframe 7 may serve as a maximum transmit power for each of subframe 8 and subframe 9).

The configuration of a minimum guaranteed power on an uplink component carrier may be useful in ensuring that a transmission over the shared radio frequency spectrum band can be made. When a transmission over the shared radio frequency spectrum band cannot be made, the UE that was supposed to make the transmission may need to perform another CCA (or extended CCA) to contend for access to the shared radio frequency spectrum band, and it is possible that the UE may not win the CCA, therefore delaying the transmission and/or incurring costly overhead (e.g., increased power use, processing delays, etc.). The carryover of a result of a power management operation, from a current subframe to a subsequent subframe, may be useful in that it helps to maintain the validity of a CCA determination made by another device (e.g., another UE, a base station, a wireless access point, a Wi-Fi station, etc.) in the vicinity of the UE. For example, if a second UE successfully contends for access to the shared radio frequency spectrum band while a first UE is transmitting at a reduced power in a current subframe, but the first UE then increases its transmit power for a subsequent subframe without performing an updated CCA, the increased transmit power of the first UE in the subsequent subframe may interfere with a transmission of the second UE in the subsequent subframe.

With reference to Scenario B in FIG. 5, a power management operation may be performed on the first uplink component carrier in subframe 7, resulting in a reduction of the transmit power on the first uplink component carrier to a reduced power. Then, because of the power reduction in subframe 7, and because of the risk of further power reductions in subsequent subframes, transmissions on the first uplink component carrier are dropped for all uplink subframes subsequent to subframe 7 (e.g., transmissions on the first uplink component carrier are dropped for subframe 8 and subframe 9).

With reference to Scenario C in FIG. 5, a need for a power management operation on the first uplink component carrier may arise for subframe 7, and because of the need for a power management operation, a transmission on the first uplink component carrier may be dropped. A transmission on the first uplink component carrier may also be dropped for at least one subsequent subframe (e.g., for each uplink subframe between subframe 7 and the next frame boundary). Although Scenario C results in no transmissions being made on the first uplink component carrier, Scenario C ensures that a consistent power is maintained for the duration of an uplink transmission (e.g., for each of subframe 7, subframe 8, and subframe 9).

Scenarios A, B, and C in FIG. 5 are exemplary, and other techniques for performing a power management operation on an uplink component carrier transmitted over a shared radio frequency spectrum band are described in the present disclosure.

Figure 6:
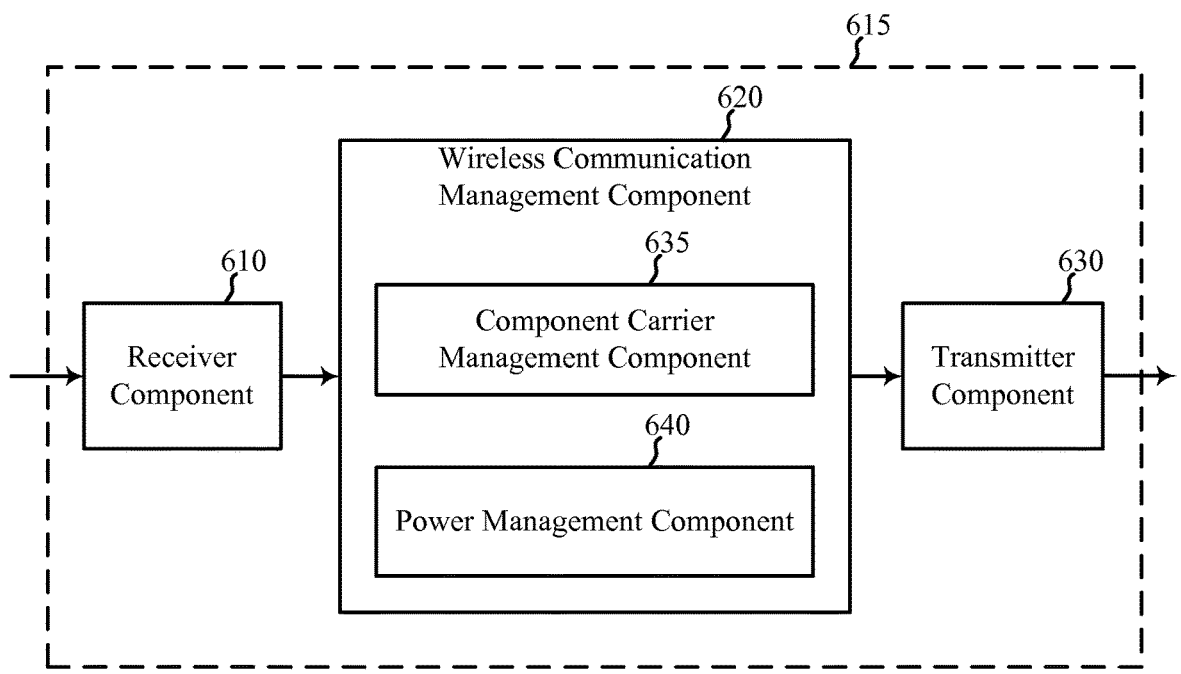
FIG. 6 shows a block diagram of an apparatus for use in wireless communication, in accordance with various aspects of the present disclosure.

FIG. 6 shows a block diagram 600 of an apparatus 615 for use in wireless communication, in accordance with various aspects of the present disclosure. The apparatus 615 may be an example of aspects of one or more of the UEs 115, 215, 215-a, 215-b, 215-c, 315, or 415 described with reference to FIG. 1, 2, 3, or 4. The apparatus 615 may also be or include a processor. The apparatus 615 may include a receiver component 610, a wireless communication management component 620, or a transmitter component 630. Each of these components may be in communication with each other.

The components of the apparatus 615 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 610 may include at least one radio frequency (RF) receiver, such as at least one RF receiver operable to receive transmissions over a licensed radio frequency spectrum band (e.g., a radio frequency spectrum band for which transmitting apparatuses may not contend for access because the radio frequency spectrum band is licensed to specific users for specific uses, such as a licensed radio frequency spectrum band usable for LTE/LTE-A communications) or a shared radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the shared radio frequency spectrum band may be used for LTE/LTE-A communications, as described, for example, with reference to FIG. 1, 2, 3, or 4. The receiver component 610 may be used to receive various types of data or control signals (i.e., transmissions) over one or more communication links of a wireless communication system, such as one or more communication links of the wireless communication system 100, 200, 300, or 400 described with reference to FIG. 1, 2, 3, or 4. The communication links may be established over the licensed radio frequency spectrum band or the shared radio frequency spectrum band.

In some examples, the transmitter component 630 may include at least one RF transmitter, such as at least one RF transmitter operable to transmit over the licensed radio frequency spectrum band or the shared radio frequency spectrum band. The transmitter component 630 may be used to transmit various types of data or control signals (i.e., transmissions) over one or more communication links of a wireless communication system, such as one or more communication links of the wireless communication system 100, 200, 300, or 400 described with reference to FIG. 1, 2, 3, or 4. The communication links may be established over the licensed radio frequency spectrum band or the shared radio frequency spectrum band.

In some examples, the wireless communication management component 620 may be used to manage one or more aspects of wireless communication for the apparatus 615. In some examples, the wireless communication management component 620 may include a component carrier management component 635 or a power management component 640.

In some examples, the component carrier management component 635 may be used to identify one or more of a plurality of component carriers configured for a UE (e.g., a UE including the apparatus 615). In some examples, the plurality of component carriers may be configured for a carrier aggregation operation for the UE. In some examples, the plurality of component carriers may be configured for a dual-connectivity operation for the UE. In some examples, the plurality of component carriers may include a first uplink component carrier. In some examples, the plurality of component carriers may also include a second uplink component carrier.

The component carrier management component 635 may also be used to determine the radio frequency spectrum band(s) over which one or more of the plurality of component carriers is transmitted. For example, the component carrier management component 635 may be used to determine the radio frequency spectrum band(s) over which the first uplink component carrier and/or the second uplink component carrier are transmitted. In some examples, the component carrier management component 635 may determine that the first uplink component carrier is transmitted over the shared radio frequency spectrum band. In some examples, the component carrier management component 635 may determine that the second uplink component carrier is transmitted over the shared radio frequency spectrum band or the licensed radio frequency spectrum band.

In some examples, the power management component 640 may be used to perform a power management operation on one or more of the plurality of component carriers identified by the component carrier management component 635. The power management operation may be performed for a current subframe, and may be performed because, for example, the power management component 640 determines that the initial or default power settings for the plurality of component carriers configured for a UE including the apparatus 715 exceed an allowed total maximum transmit power for the UE.

In some examples, the power management component 640 may be used to perform a power management operation on a first uplink component carrier for a current subframe. The power management operation may be based at least in part on a determination, by the component carrier management component 635, that the first uplink component carrier is transmitted over the shared radio frequency spectrum band.

In some examples, the power management operation performed on the first uplink component carrier, for the current subframe, may include maintaining a transmit power on the first uplink component carrier at or above a minimum guaranteed power; scaling the transmit power on the first uplink component carrier to a reduced power for the current subframe; using a transmit power on the first uplink component carrier, during a subframe preceding the current subframe, as a maximum transmit power on the first uplink component carrier for the current subframe; and/or dropping a transmission on the first uplink component carrier for the current subframe.

Figure 7:
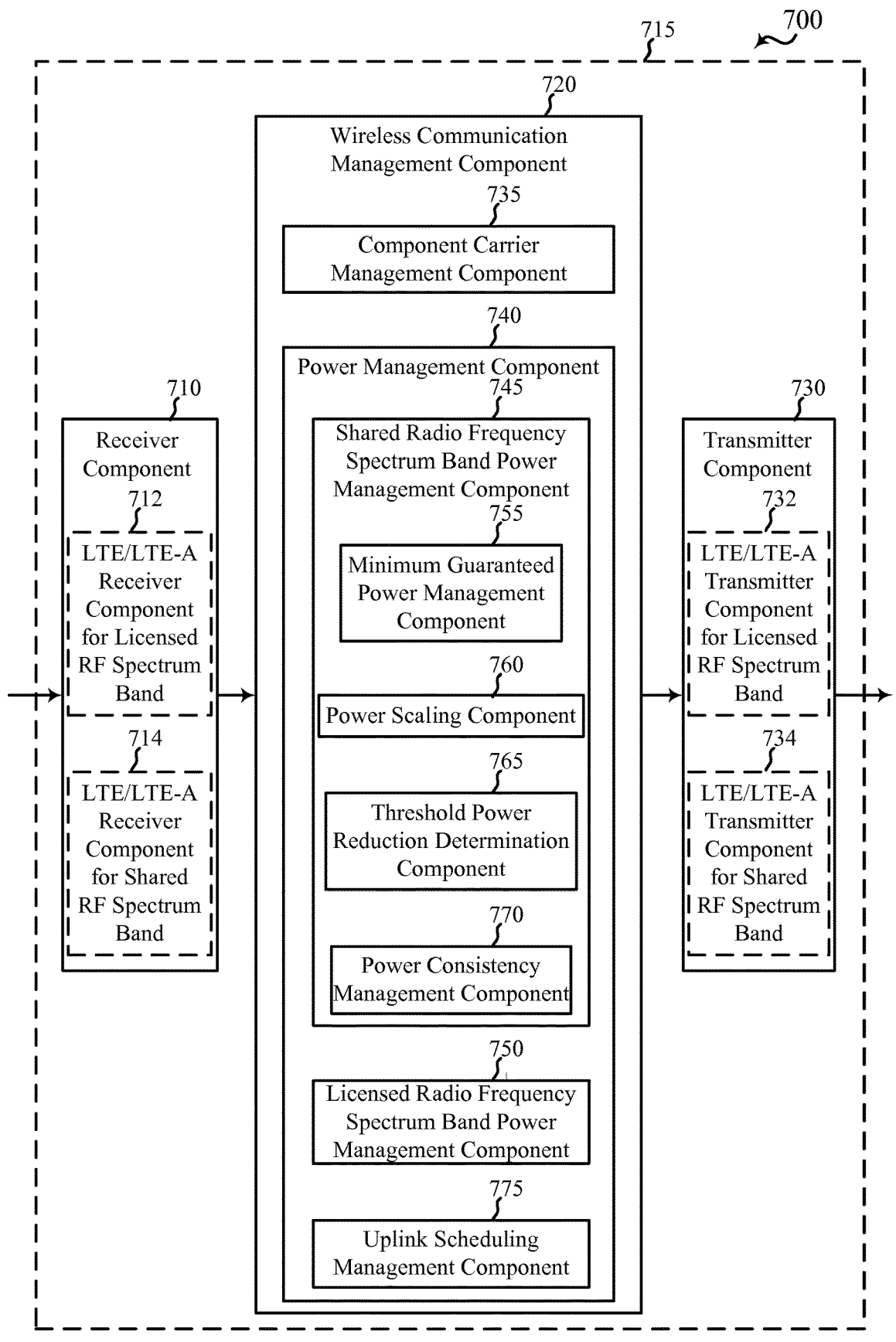
FIG. 7 shows a block diagram of an apparatus for use in wireless communication, in accordance with various aspects of the present disclosure.

FIG. 7 shows a block diagram 700 of an apparatus 715 for use in wireless communication, in accordance with various aspects of the present disclosure. The apparatus 715 may be an example of aspects of one or more of the UEs 115, 215, 215-a, 215-b, 215-c, 315, or 415 described with reference to FIG. 1, 2, 3, or 4, or aspects of the apparatus 615 described with reference to FIG. 6. The apparatus 715 may also be or include a processor. The apparatus 715 may include a receiver component 710, a wireless communication management component 720, or a transmitter component 730. Each of these components may be in communication with each other.

The components of the apparatus 715 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 710 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to specific users for specific uses, such as a licensed radio frequency spectrum band usable for LTE/LTE-A communications) or a shared radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the shared radio frequency spectrum band may be used for LTE/LTE-A communications, as described, for example, with reference to FIG. 1, 2, 3, or 4. The receiver component 710 may in some cases include separate receivers for the licensed radio frequency spectrum band and the shared radio frequency spectrum band. The separate receivers may, in some examples, take the form of an LTE/LTE-A receiver component for communicating over the licensed radio frequency spectrum band (e.g., LTE/LTE-A receiver component for licensed RF spectrum band 712), and an LTE/LTE-A receiver component for communicating over the shared radio frequency spectrum band (e.g., LTE/LTE-A receiver component for shared RF spectrum band 714). The receiver component 710, including the LTE/LTE-A receiver component for licensed RF spectrum band 712 or the LTE/LTE-A receiver component for shared RF spectrum band 714, may be used to receive various types of data or control signals (i.e., transmissions) over one or more communication links of a wireless communication system, such as one or more communication links of the wireless communication system 100, 200, 300, or 400 described with reference to FIG. 1, 2, 3, or 4. The communication links may be established over the licensed radio frequency spectrum band or the shared radio frequency spectrum band.

In some examples, the transmitter component 730 may include at least one RF transmitter, such as at least one RF transmitter operable to transmit over the licensed radio frequency spectrum band or the shared radio frequency spectrum band. The transmitter component 730 may in some cases include separate transmitters for the licensed radio frequency spectrum band and the shared radio frequency spectrum band. The separate transmitters may, in some examples, take the form of an LTE/LTE-A transmitter component for communicating over the licensed radio frequency spectrum band (e.g., LTE/LTE-A transmitter component for licensed RF spectrum band 732), and an LTE/LTE-A transmitter component for communicating over the shared radio frequency spectrum band (e.g., LTE/LTE-A transmitter component for shared RF spectrum band 734). The transmitter component 730, including the LTE/LTE-A transmitter component for licensed RF spectrum band 732 or the LTE/LTE-A transmitter component for shared RF spectrum band 734, may be used to transmit various types of data or control signals (i.e., transmissions) over one or more communication links of a wireless communication system, such as one or more communication links of the wireless communication system 100, 200, 300, or 400 described with reference to FIG. 1, 2, 3, or 4. The communication links may be established over the licensed radio frequency spectrum band or the shared radio frequency spectrum band.

In some examples, the wireless communication management component 720 may be used to manage one or more aspects of wireless communication for the apparatus 715. In some examples, the wireless communication management component 720 may include a component carrier management component 735 or a power management component 740.

In some examples, the component carrier management component 735 may be used to identify one or more of a plurality of component carriers configured for a UE (e.g., a UE including the apparatus 715). In some examples, the plurality of component carriers may be configured for a carrier aggregation operation for the UE. In some examples, the plurality of component carriers may be configured for a dual-connectivity operation for the UE. In some examples, the plurality of component carriers may include a first uplink component carrier. In some examples, the plurality of component carriers may also include a second uplink component carrier.

The component carrier management component 735 may also be used to determine the radio frequency spectrum band(s) over which one or more of the plurality of component carriers is transmitted. For example, the component carrier management component 735 may be used to determine the radio frequency spectrum band(s) over which the first uplink component carrier and/or the second uplink component carrier are transmitted. In some examples, the component carrier management component 735 may determine that the first uplink component carrier is transmitted over the shared radio frequency spectrum band. In some examples, the component carrier management component 735 may determine that the second uplink component carrier is transmitted over the shared radio frequency spectrum band or the licensed radio frequency spectrum band.

In some examples, the power management component 740 may be used to perform a power management operation on one or more of the plurality of component carriers identified by the component carrier management component 735. The power management operation may be performed for a current subframe, and may be performed because, for example, the power management component 740 determines that the initial or default power settings for the plurality of component carriers configured for a UE including the apparatus 715 exceed an allowed total maximum transmit power for the UE. In some examples, the power management component 740 may include a shared radio frequency spectrum band power management component 745, a licensed radio frequency spectrum band power management component 750, or an uplink scheduling management component 775.

In some examples, the shared radio frequency spectrum band power management component 745 may be used to perform a power management operation on one or more component carriers based on a determination, by the component carrier management component 735, that the one or more component carriers are uplink component carriers transmitted over the shared radio frequency spectrum band. For example, the shared radio frequency spectrum band power management component 745 may be used to perform a power management operation, for a current subframe, on a first uplink component carrier identified by the component carrier management component 735. In some examples, the shared radio frequency spectrum band power management component 745 may include a minimum guaranteed power management component 755, a power scaling component 760, a threshold power reduction determination component 765, or a power consistency management component 770. For purposes of illustration, exemplary uses and operations of the minimum guaranteed power management component 755, the power scaling component 760, the threshold power reduction determination component 765, and the power consistency management component 770 are described below in the context of performing a power management operation on a first uplink component carrier transmitted over the shared radio frequency spectrum band. These components may also be used to perform a power management operation on one or more other uplink component carriers transmitted over the shared radio frequency spectrum band.

In some examples, the minimum guaranteed power management component 755 may be used to maintain, on the first uplink component carrier and for the current subframe, a transmit power above a minimum guaranteed power. For example, the power scaling component 760 may be used to scale the transmit power on the first uplink component carrier to a reduced power, and the minimum guaranteed power management component 755 may ensure that the reduced power does not fall below the minimum guaranteed power.

In some examples, the minimum guaranteed power may depend on a channel type or uplink information type transmitted on the first uplink component carrier. For example, the minimum guaranteed power may include at least one of a PUCCH minimum guaranteed power component and a PUSCH guaranteed minimum power component, with the minimum guaranteed power at which the transmit power of the first uplink component carrier is maintained depending on whether a PUCCH and/or a PUSCH is scheduled to be transmitted on the first uplink component carrier during the current subframe. When a PUCCH is scheduled to be transmitted on the first uplink component carrier during the current subframe, the minimum guaranteed power may include the PUCCH minimum guaranteed power component. When a PUSCH is scheduled to be transmitted on the first uplink component carrier during the current subframe, the minimum guaranteed power may include the PUSCH minimum guaranteed power component. When a PUCCH and a PUSCH are scheduled to be transmitted on the first uplink component carrier during the current subframe, the minimum guaranteed power may include a combination and/or scaled percentage of the PUCCH minimum guaranteed power component and/or the PUSCH minimum guaranteed power component. In the case of scheduling both a PUCCH and a PUSCH on the first uplink component carrier during the current subframe, the minimum guaranteed power may also include a separately defined PUCCH/PUSCH minimum guaranteed power component. As another example, if a hybrid automatic repeat request (HARQ) acknowledgement (ACK) is present, a first minimum guaranteed power may be used, and if a channel state information (CSI) report is present, a second minimum guaranteed power may be used.

When a power management operation is performed by the shared radio frequency spectrum band power management component 745 for one or more other component carriers in the plurality of component carriers, and when the one or more other component carriers include at least a second uplink component carrier, the same minimum guaranteed power or different minimum guaranteed powers may be maintained for the first uplink component carrier and the second uplink component carrier.

In some examples, the power scaling component 760 may be used to scale a transmit power on the first uplink component carrier to a reduced power for the current subframe. The power scaling component 760 may also or alternatively be configured to drop a transmission on the first uplink component carrier for the current subframe. In some examples, the transmission on the first uplink component carrier may be dropped for the current subframe because of a need to perform a power management operation on the first uplink component carrier, or because of a need to scale the transmit power on the first uplink component carrier. In some examples, the transmission on the first uplink component carrier may be dropped for the current subframe because a scaling of transmit power on the first uplink component carrier surpasses a threshold power reduction (as determined, for example, by the threshold power reduction determination component 765).

In some examples, the threshold power reduction determination component 765 may be used to determine whether a power management operation performed by the shared radio frequency spectrum band power management component 745 results in power reduction that surpasses a threshold power reduction. A determination made by the threshold power reduction determination component 765 may be used, for example by the power scaling component 760 or the power consistency management component 770 to determine, for example, whether a transmission on the first uplink component carrier should be dropped. The determination made by the threshold power reduction determination component 765 may also be used by the uplink scheduling management component 775, to determine an scheduling for a subframe.

In some examples, the power consistency management component 770 may be used to manage the power level on the first uplink component carrier from subframe-to-subframe. For example, the power consistency management component 770 may use a reduced power on the first uplink component carrier, in a current subframe, as a maximum transmit power on the first uplink component carrier for at least one subsequent subframe following the current subframe. Alternatively, the power consistency management component 770 may be used to drop a transmission on the first uplink component carrier for at least one subsequent subframe following the current subframe. In some examples, the at least one subsequent subframe following the current subframe may include at least one uplink subframe between the current subframe and a boundary of a subsequent frame. In some examples, the at least one subsequent subframe following the current subframe may include each of a number of uplink subframes between the current subframe and the boundary of the subsequent frame.

In some examples, the performance of a power management operation on the first uplink component carrier, by the power consistency management component 770, may be triggered by a need to perform a power management operation on the first uplink component carrier for a current subframe; or by a scaling of transmit power on the first uplink component carrier for the current subframe; or by a scaling of transmit power on the first uplink component carrier for the current subframe, which scaling surpasses a threshold power reduction; or by a dropping of a transmission on the first uplink component carrier for the current subframe.

In some examples, and upon dropping a transmission on an uplink component carrier transmitted over the shared radio frequency spectrum band, the shared radio frequency spectrum band power management component 745 may trigger the performance of a CCA for at least one subsequent uplink subframe following a subframe in which a transmission has been dropped. In some examples, the CCA may take the form of an extended CCA.

In some examples, the licensed radio frequency spectrum band power management component 750 may be used to perform a power management operation on one or more component carriers based on a determination, by the component carrier management component 735, that the one or more component carriers are uplink component carriers transmitted over the licensed radio frequency spectrum band.

In some examples, the uplink scheduling management component 775 may be used to determine which of a number of uplink schedulings is used for an uplink component carrier during a current subframe. By way of example, an exemplary operation of the uplink scheduling management component 775 is described herein in the context of uplink scheduling for a first uplink component carrier transmitted over the shared radio frequency spectrum band.

In some examples, the uplink scheduling management component 775 may receive a first uplink scheduling for the first uplink component carrier for a current subframe, and receive a second uplink scheduling for the first uplink component carrier for the current subframe. When a power management operation is performed on the first uplink component carrier for the current subframe, the uplink scheduling management component 775 may use the second uplink scheduling for the first uplink component carrier for the current subframe. However, when a power management operation is not performed on the first uplink component carrier for the current subframe, the uplink scheduling management component 775 may use the first uplink scheduling for the first uplink component carrier for the current subframe. Alternatively, the uplink scheduling management component 775 may use the first uplink scheduling or the second uplink scheduling based at least in part on a condition of a power management operation performed. Alternatively, and upon the total transmit power on the first uplink component carrier being scaled to a reduced power for the current subframe, the uplink scheduling management component 775 may use the first uplink scheduling for the first uplink component carrier for the current subframe when the scaling does not surpass a threshold power reduction, and use the second uplink scheduling for the first uplink component carrier for the current subframe when the scaling surpasses the threshold power reduction.

Figure 8:
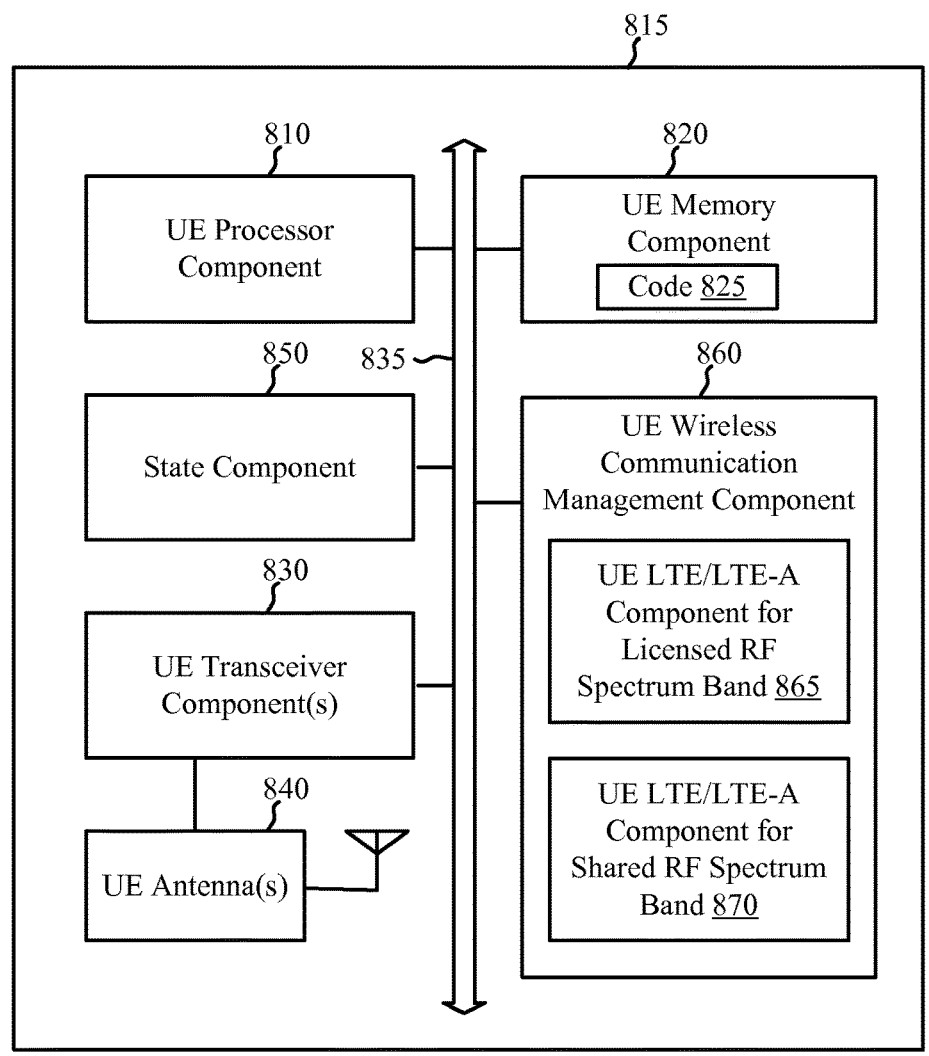
FIG. 8 shows a block diagram of a UE for use in wireless communication, in accordance with various aspects of the present disclosure.

FIG. 8 shows a block diagram 800 of a UE 815 for use in wireless communication, in accordance with various aspects of the present disclosure. The UE 815 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 815 may, in some examples, have an internal power supply (not shown), such as a small battery, to facilitate mobile operation. In some examples, the UE 815 may be an example of aspects of one or more of the UE 115, 215, 215-*a*, 215-*b*, 215-*c*, 315, or 415 described with reference to FIG. 1, 2, 3, or 4, or aspects of one or more of the apparatuses 615 or 715 described with reference to FIG. 6 or 7. The UE 815 may be configured to implement at least some of the UE or apparatus features and functions described with reference to FIG. 1, 2, 3, 4, 5, 6, or 7.

The UE 815 may include a UE processor component 810, a UE memory component 820, at least one UE transceiver component (represented by UE transceiver component(s) 830), at least one UE antenna (represented by UE antenna(s) 840), or a UE wireless communication management component 860. Each of these components may be in communication with each other, directly or indirectly, over one or more buses 835.

The UE memory component 820 may include random access memory (RAM) or read-only memory (ROM). The UE memory component 820 may store computer-readable, computer-executable code 825 containing instructions that are configured to, when executed, cause the UE processor component 810 to perform various functions described herein related to wireless communication, including the performance of a power management operation on one or more of a plurality of component carriers configured for the UE 815. Alternatively, the code 825 may not be directly executable by the UE processor component 810 but be configured to cause the UE 815 (e.g., when compiled and executed) to perform various of the functions described herein.

The UE processor component 810 may include an intelligent hardware device, e.g., a central processing unit (CPU), a microcontroller, an ASIC, etc. The UE processor component 810 may process information received through the UE transceiver component(s) 830 or information to be sent to the UE transceiver component(s) 830 for transmission through the UE antenna(s) 840. The UE processor component 810 may handle, alone or in connection with the UE wireless communication management component 860, various aspects of communicating over (or managing communications over) a licensed radio frequency spectrum band (e.g., a radio frequency spectrum band for which apparatuses do not contend for access because the radio frequency spectrum band is licensed to specific users for specific uses, such as a licensed radio frequency spectrum band usable for LTE/LTE-A communications) or an shared radio frequency spectrum band (e.g., a radio frequency spectrum band for which apparatuses may need to contend for access because the radio frequency spectrum band is available for unlicensed use, such as Wi-Fi use).

The UE transceiver component(s) 830 may include a modem configured to modulate packets and provide the modulated packets to the UE antenna(s) 840 for transmission, and to demodulate packets received from the UE antenna(s) 840. The UE transceiver component(s) 830 may, in some examples, be implemented as one or more UE transmitter components and one or more separate UE receiver components. The UE transceiver component(s) 830 may support communications in the licensed radio frequency spectrum band or the shared radio frequency spectrum band. The UE transceiver component(s) 830 may be configured to communicate bi-directionally, via the UE antenna(s) 840, with one or more of the base stations 105, 205, 205-*a*, 305, 405, or 405-*a* described with reference to FIG. 1, 2, 3, or 4. While the UE 815 may include a single UE antenna, there may be examples in which the UE 815 may include multiple UE antennas 840.

The UE state component 850 may be used, for example, to manage transitions of the UE 815 between an RRC idle state and an RRC connected state, and may be in communication with other components of the UE 815, directly or indirectly, over the one or more buses 835. The UE state component 850, or portions of it, may include a processor, or some or all of the functions of the UE state component 850 may be performed by the UE processor component 810 or in connection with the UE processor component 810.

The UE wireless communication management component 860 may be configured to perform or control some or all of the UE or apparatus features or functions described with reference to FIG. 1, 2, 3, 4, 5, 6, or 7 related to wireless communication over a licensed radio frequency spectrum band or a shared radio frequency spectrum band. For example, the UE wireless communication management component 860 may be configured to support a supplemental downlink mode, a carrier aggregation mode, a standalone mode, or a dual-connectivity mode using the licensed radio frequency spectrum band or the shared radio frequency spectrum band. The UE wireless communication management component 860 may include a UE LTE/LTE-A component for licensed RF spectrum band 865 configured to handle LTE/LTE-A communications in the licensed radio frequency spectrum band, and a UE LTE/LTE-A component for shared RF spectrum band 870 configured to handle LTE/LTE-A communications in the shared radio frequency spectrum band. The UE wireless communication management component 860, or portions of it, may include a processor, or some or all of the functions of the UE wireless communication management component 860 may be performed by the UE processor component 810 or in connection with the UE processor component 810. In some examples, the UE wireless communication management component 860 may be an example of the wireless communication management component 620 or 720 described with reference to FIG. 6 or 7.

Figure 9:
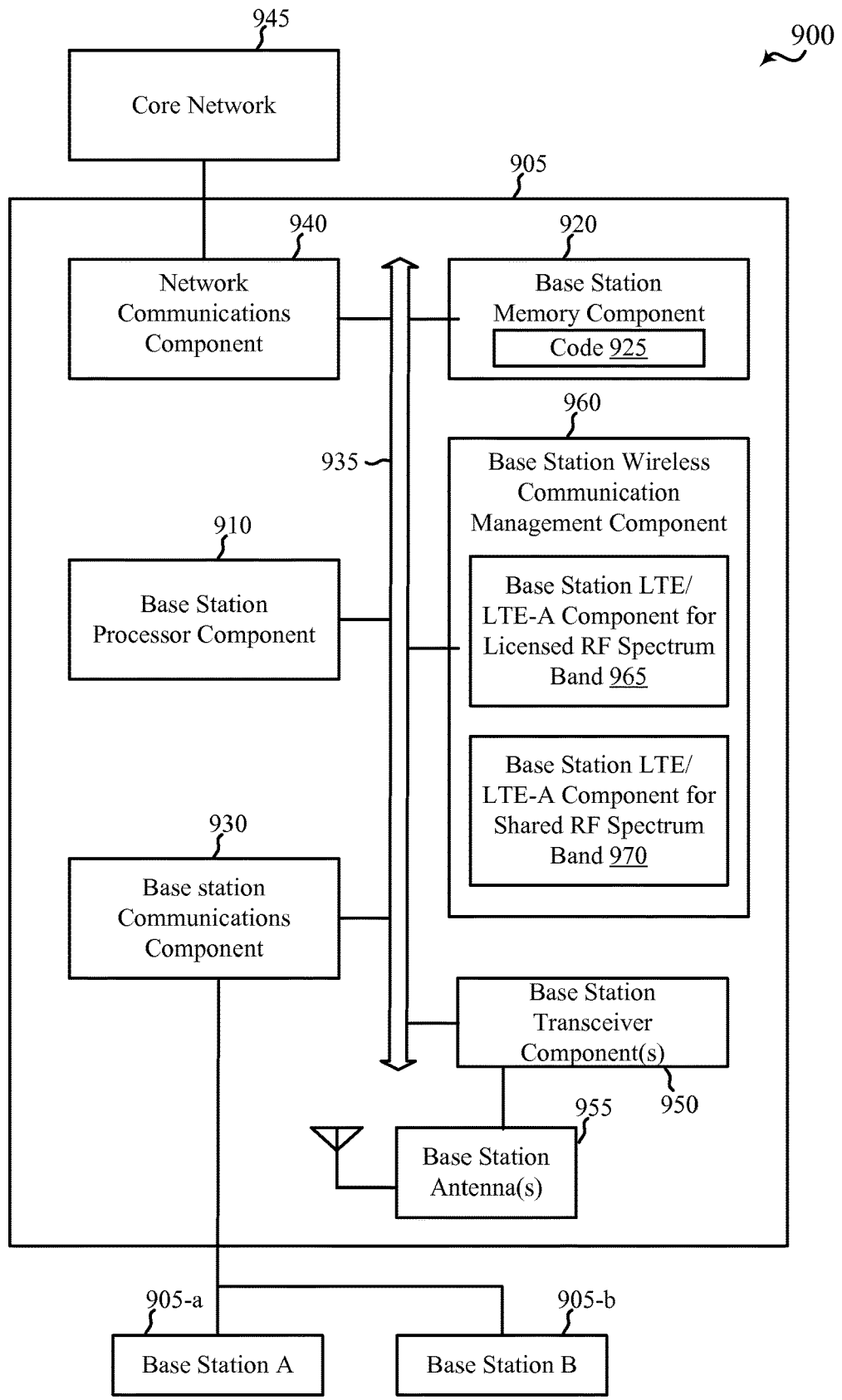
FIG. 9 shows a block diagram of a base station (e.g., a base station forming part or all of an eNB) for use in wireless communication, in accordance with various aspects of the present disclosure.

FIG. 9 shows a block diagram 900 of a base station 905 (e.g., a base station forming part or all of an eNB) for use in wireless communication, in accordance with various aspects of the present disclosure. In some examples, the base station 905 may be an example of one or more aspects of the base station 105, 205, 205-*a*, 305, 405, or 405-*a* described with reference to FIG. 1, 2, 3, or 4. The base station 905 may be configured to implement or facilitate at least some of the base station features and functions described with reference to FIG. 1, 2, 3, 4, or 5.

The base station 905 may include a base station processor component 910, a base station memory component 920, at least one base station transceiver component (represented by base station transceiver component(s) 950), at least one base station antenna (represented by base station antenna(s) 955), or a base station wireless communication management component 960. The base station 905 may also include one or more of a base station communications component 930 or a network communications component 940. Each of these components may be in communication with each other, directly or indirectly, over one or more buses 935.

The base station memory component 920 may include RAM or ROM. The base station memory component 920 may store computer-readable, computer-executable code 925 containing instructions that are configured to, when executed, cause the base station processor component 910 to perform various functions described herein related to wireless communication, including the transmission of alternative uplink schedulings to a UE. Alternatively, the code 925 may not be directly executable by the base station processor component 910 but be configured to cause the base station 905 (e.g., when compiled and executed) to perform various of the functions described herein.

The base station processor component 910 may include an intelligent hardware device, e.g., a CPU, a microcontroller, an ASIC, etc. The base station processor component 910 may process information received through the base station transceiver component(s) 950, the base station communications component 930, or the network communications component 940. The base station processor component 910 may also process information to be sent to the transceiver component(s) 950 for transmission through the antenna(s) 955, to the base station communications component 930, for transmission to one or more other base stations 905-a and 905-b, or to the network communications component 940 for transmission to a core network 945, which may be an example of one or more aspects of the core network 130 described with reference to FIG. 1. The base station processor component 910 may handle, alone or in connection with the base station wireless communication management component 960, various aspects of communicating over (or managing communications over) a licensed radio frequency spectrum band (e.g., a radio frequency spectrum band for which apparatuses do not contend for access because the radio frequency spectrum band is licensed to specific users for specific uses, such as a licensed radio frequency spectrum band usable for LTE/LTE-A communications) or an shared radio frequency spectrum band (e.g., a radio frequency spectrum band for which apparatuses may need to contend for access because the radio frequency spectrum band is available for unlicensed use, such as Wi-Fi use).

The base station transceiver component(s) 950 may include a modem configured to modulate packets and provide the modulated packets to the base station antenna(s) 955 for transmission, and to demodulate packets received from the base station antenna(s) 955. The base station transceiver component(s) 950 may, in some examples, be implemented as one or more base station transmitter components and one or more separate base station receiver components. The base station transceiver component(s) 950 may support communications in the licensed radio frequency spectrum band or the shared radio frequency spectrum band. The base station transceiver component(s) 950 may be configured to communicate bi-directionally, via the antenna(s) 955, with one or more UEs or apparatuses, such as one or more of the UEs 115, 215, 215-a, 215-b, 215-c, 315, 415, or 815 described with reference to FIG. 1, 2, 3, 4, or 8, or one or more of the apparatuses 615 or 715 described with reference to FIG. 16 or 17. The base station 905 may, for example, include multiple base station antennas 955 (e.g., an antenna array). The base station 905 may communicate with the core network 945 through the network communications component 940. The base station 905 may also communicate with other base stations, such as the base stations 905-a and 905-b, using the base station communications component 930.

The base station wireless communication management component 960 may be configured to perform or control some or all of the features or functions described with reference to FIG. 1, 2, 3, 4, or 5 related to wireless communication over a licensed radio frequency spectrum band or a shared radio frequency spectrum band. For example, the base station wireless communication management component 960 may be configured to support a supplemental downlink mode, a carrier aggregation mode, a stand-alone mode using, or a dual-connectivity mode using the licensed radio frequency spectrum band or the shared radio frequency spectrum band. The base station wireless communication management component 960 may include a base station LTE/LTE-A component for licensed RF spectrum band 965 configured to handle LTE/LTE-A communications in the licensed radio frequency spectrum band, and a base station LTE/LTE-A component for shared RF spectrum band 970 configured to handle LTE/LTE-A communications in the shared radio frequency spectrum band. The base station wireless communication management component 960, or portions of it, may include a processor, or some or all of the functions of the base station wireless communication management component 960 may be performed by the base station processor component 910 or in connection with the base station processor component 910.

Figure 10:
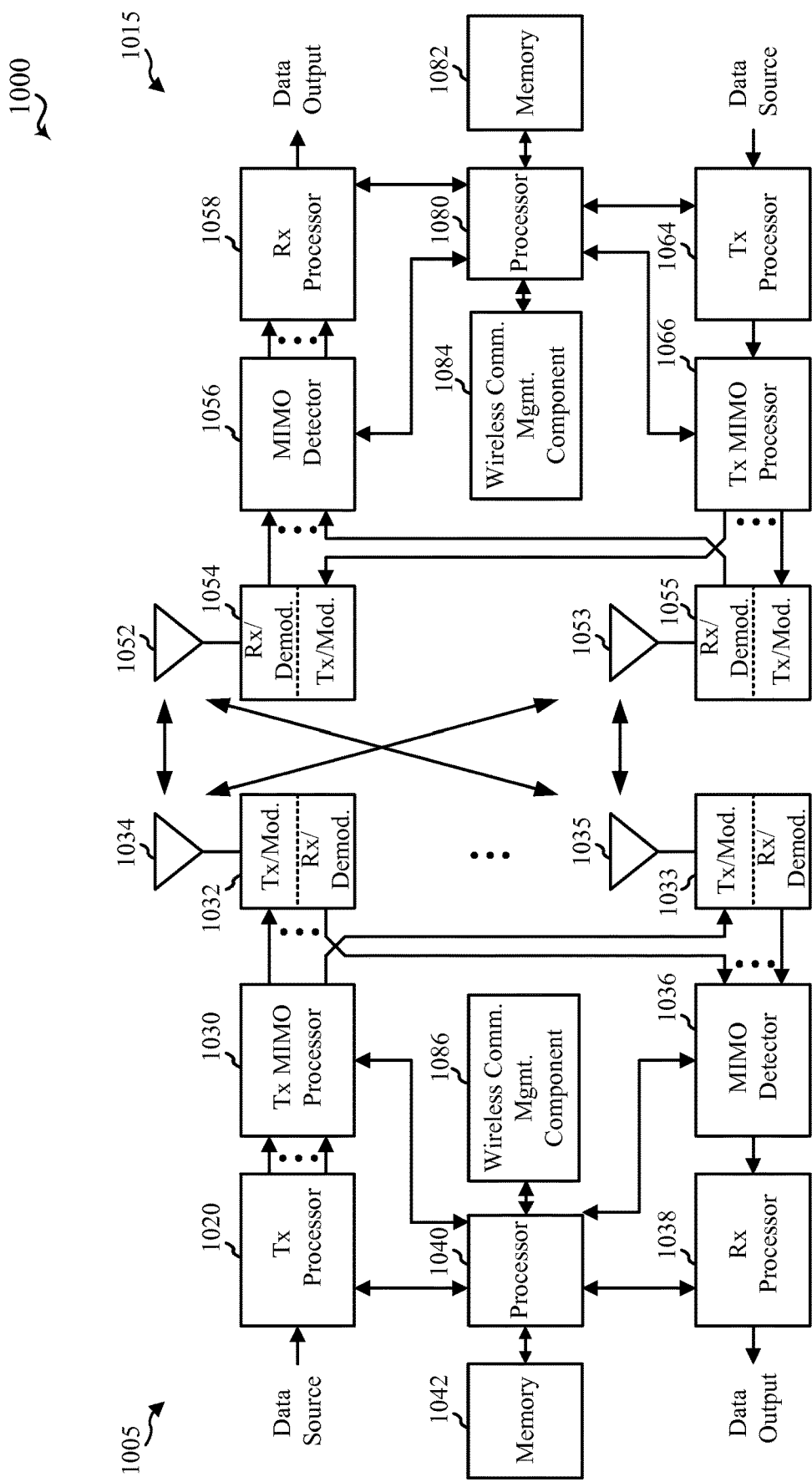
FIG. 10 is a block diagram of a multiple input/multiple output (MIMO) communication system including a base station and a UE, in accordance with various aspects of the present disclosure.

FIG. 10 is a block diagram of a multiple input/multiple output (MIMO) communication system 1000 including a base station 1005 and a UE 1015, in accordance with various aspects of the present disclosure. The MIMO communication system 1000 may illustrate aspects of the wireless communication system 100, 200, 300, or 400 described with reference to FIG. 1, 2, 3, or 4. The base station 1005 may be an example of aspects of the base station 105, 205, 205-a, 305, 405, 405-a, or 905 described with reference to FIG. 1, 2, 3, 4, or 9. The base station 1005 may be equipped with antennas 1034 through 1035, and the UE 1015 may be equipped with antennas 1052 through 1053. In the MIMO communication system 1000, the base station 1005 may be able to send data over multiple communication links at the same time. Each communication link may be called a "layer" and the "rank" of the communication link may indicate the number of layers used for communication. For example, in a 2×2 MIMO communications system where base station 1005 transmits two "layers," the rank of the communication link between the base station 1005 and the UE 1015 is two.

At the base station 1005, a transmit processor 1020 may receive data from a data source. The transmit processor 1020 may process the data. The transmit processor 1020 may also generate control symbols or reference symbols. A transmit (Tx) MIMO processor 1030 may perform spatial processing (e.g., precoding) on data symbols, control symbols, or reference symbols, if applicable, and may provide output symbol streams to the transmit modulators 1032 through 1033. Each modulator 1032 through 1033 may process a respective output symbol stream (e.g., for OFDM, etc.) to obtain an output sample stream. Each modulator 1032 through 1033 may further process (e.g., convert to analog, amplify, filter, and upconvert) the output sample stream to obtain a DL signal. In one example, DL signals from modulators 1032 through 1033 may be transmitted via the antennas 1034 through 1035, respectively.

The UE 1015 may be an example of aspects of the UE 115, 215, 215-a, 215-b, 215-c, 315, 415, or 815 described with reference to FIG. 1, 2, 3, 4, or 8, or aspects of the apparatus 615 or 715 described with reference to FIG. 6 or 7. At the UE 1015, the UE antennas 1052 through 1053 may receive the DL signals from the base station 1005 and may provide the received signals to the demodulators 1054 through 1055, respectively. Each demodulator 1054 through 1055 may condition (e.g., filter, amplify, downconvert, and digitize) a respective received signal to obtain input samples. Each demodulator 1054 through 1055 may further process the input samples (e.g., for OFDM, etc.) to obtain received symbols. A MIMO detector 1056 may obtain received symbols from all the demodulators 1054 through 1055, perform MIMO detection on the received symbols, if applicable, and provide detected symbols. A receive (Rx) processor 1058 may process (e.g., demodulate, deinterleave, and decode) the detected symbols, providing decoded data for the UE 1015 to a data output, and provide decoded control information to a processor 1080, or memory 1082.

The processor 1080 may in some cases execute stored instructions to instantiate a wireless communication management component 1084. The wireless communication management component 1084 may be an example of aspects of the wireless communication management component 620, 720, or 860 described with reference to FIG. 6, 7, or 8.

On the uplink (UL), at the UE 1015, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulators 1054 through 1055 (e.g., for SC-FDMA, etc.), and be transmitted to the base station 1005 in accordance with the transmission parameters received from the base station 1005. At the base station 1005, the UL signals from the UE 1015 may be received by the antennas 1034 through 1035, processed by the demodulators 1032 through 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a wireless communication management component 1086. The wireless communication management component 1086 may be an example of aspects of the wireless communication management component 960 described with reference to FIG. 9.

The components of the UE 1015 may, individually or collectively, be implemented with one or more ASICs adapted to perform some or all of the applicable functions in hardware. Each of the noted components may be a means for performing one or more functions related to operation of the MIMO communication system 1000. Similarly, the components of the base station 1005 may, individually or collectively, be implemented with one or more ASICs adapted to perform some or all of the applicable functions in hardware. Each of the noted components may be a means for performing one or more functions related to operation of the MIMO communication system 1000.

Figure 11:
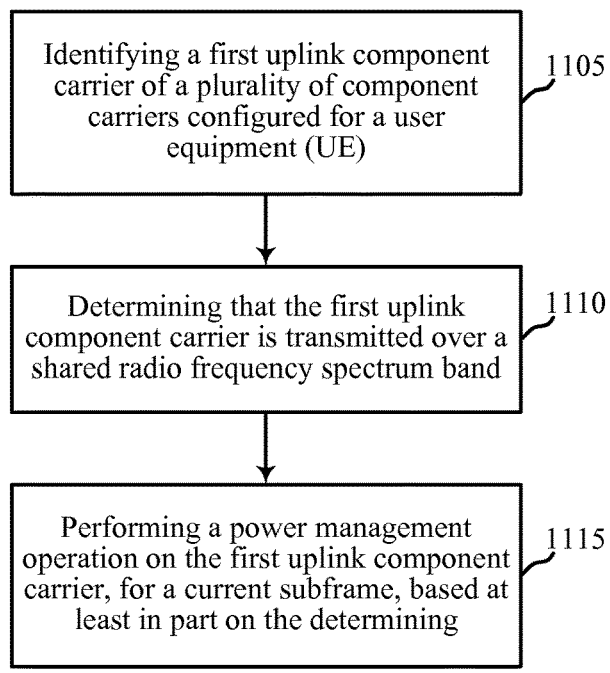
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the UEs 115, 215, 215-a, 215-b, 215-c, 315, 415, 815, or 1015 described with reference to FIG. 1, 2, 3, 4, 8, or 10, or aspects of one or more of the apparatuses 615 or 715 described with reference to FIG. 6 or 17. In some examples, a UE or apparatus may execute one or more sets of codes to control the functional elements of the UE or apparatus to perform the functions described below. Additionally or alternatively, the UE or apparatus may perform one or more of the functions described below using special-purpose hardware. The method 1100 presumes that a determination has been made to perform a power management operation for a current subframe (e.g., because the initial or default power settings for a plurality of component carriers configured for a UE or apparatus, for the current subframe, exceed an allowed total maximum transmit power for the UE or apparatus).

At block 1105, the method 1100 may include identifying a first uplink component carrier of a plurality of component carriers configured for a UE. In some examples, the plurality of component carriers may be configured for a carrier aggregation operation for the UE. In some examples, the plurality of component carriers may be configured for a dual-connectivity operation for the UE. In some examples, one or more additional component carriers of the plurality of component carriers may also be identified at block 1105. In some examples, the one or more additional component carriers may include at least a second uplink component carrier. The operation(s) at block 1105 may be performed using the wireless communication management component 620, 720, 860, or 1084 described with reference to FIG. 6, 7, 8, or 10, or the component carrier management component 635 or 735 described with reference to FIG. 6 or 7.

At block 1110, the method 1100 may include determining that the first uplink component carrier is transmitted over a shared radio frequency spectrum band. The shared radio frequency spectrum band may include a radio frequency spectrum band for which transmitting apparatuses may need to contend for access because the radio frequency spectrum band is available for unlicensed use, such as Wi-Fi use. In some examples, the radio frequency spectrum band over which one or more other component carriers are carried may also be determined at block 1110. For example, it may be determined that the second uplink component carrier is transmitted over the shared radio frequency spectrum band, or that the second uplink component carrier is transmitted over a licensed radio frequency spectrum band. The licensed radio frequency spectrum band may include a radio frequency spectrum band for which transmitting apparatuses may not contend for access because the radio frequency spectrum band is licensed to specific users for specific uses, such as a licensed radio frequency spectrum band usable for LTE/LTE-A communications. The operation(s) at block 1110 may be performed using the wireless communication management component 620, 720, 860, or 1084 described with reference to FIG. 6, 7, 8, or 10, or the component carrier management component 635 or 735 described with reference to FIG. 6 or 7.

At block 1115, the method 1100 may include performing a power management operation on the first uplink component carrier, for a current subframe, based at least in part on the determining performed at block 1110. In some examples, a power management operation may also be performed at block 1115 for one or more other component carriers in the plurality of component carriers. The operation(s) at block 1115 may be performed using the wireless communication management component 620, 720, 860, or 1084 described with reference to FIG. 6, 7, 8, or 10, the power management component 640 or 740 described with reference to FIG. 6 or 7, or the shared radio frequency spectrum band power management component 745 and/or licensed radio frequency spectrum band power management component 750 described with reference to FIG. 7.

In some examples, the power management operation performed at block 1115 may include maintaining a transmit power on the first uplink component carrier at or above a minimum guaranteed power; scaling the transmit power on the first uplink component carrier to a reduced power for the current subframe; using a transmit power on the first uplink component carrier, during a subframe preceding the current subframe, as a maximum transmit power on the first uplink component carrier for the current subframe; and/or dropping a transmission on the first uplink component carrier for the current subframe.

Thus, the method 1100 may provide for wireless communication. It should be noted that the method 1100 is just one implementation and that the operations of the method 1100 may be rearranged or otherwise modified such that other implementations are possible.

Figure 12:
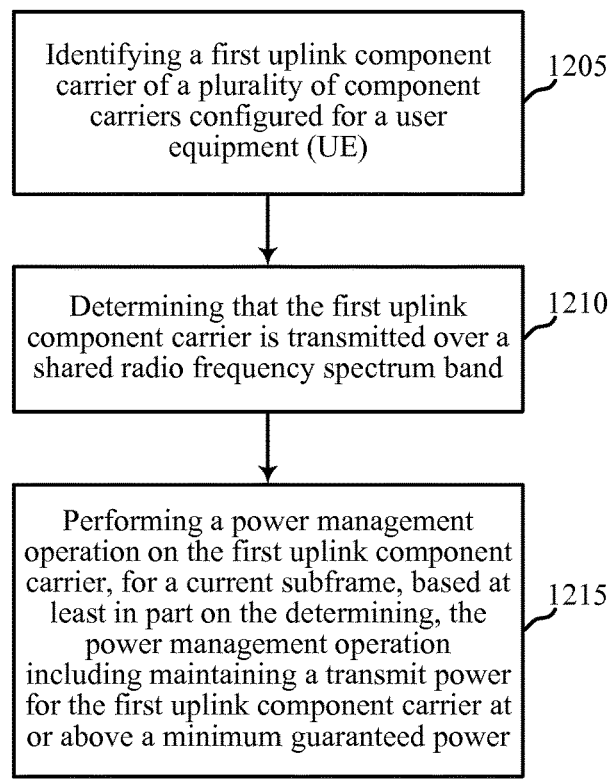
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the UEs 115, 215, 215-a, 215-b, 215-c, 315, 415, 815, or 1015 described with reference to FIG. 1, 2, 3, 4, 8, or 10, or aspects of one or more of the apparatuses 615 or 715 described with reference to FIG. 6 or 17. In some examples, a UE or apparatus may execute one or more sets of codes to control the functional elements of the UE or apparatus to perform the functions described below. Additionally or alternatively, the UE or apparatus may perform one or more of the functions described below using special-purpose hardware. The method 1200 presumes that a determination has been made to perform a power management operation for a current subframe (e.g., because the initial or default power settings for a plurality of component carriers configured for a UE or apparatus, for the current subframe, exceed an allowed total maximum transmit power for the UE or apparatus).

At block 1205, the method 1200 may include identifying a first uplink component carrier of a plurality of component carriers configured for a UE. In some examples, the plurality of component carriers may be configured for a carrier aggregation operation for the UE. In some examples, the plurality of component carriers may be configured for a dual-connectivity operation for the UE. In some examples, one or more additional component carriers of the plurality of component carriers may also be identified at block 1205. In some examples, the one or more additional component carriers may include at least a second uplink component carrier. The operation(s) at block 1205 may be performed using the wireless communication management component 620, 720, 860, or 1084 described with reference to FIG. 6, 7, 8, or 10, or the component carrier management component 635 or 735 described with reference to FIG. 6 or 7.

At block 1210, the method 1200 may include determining that the first uplink component carrier is transmitted over a shared radio frequency spectrum band. The shared radio frequency spectrum band may include a radio frequency spectrum band for which transmitting apparatuses may need to contend for access because the radio frequency spectrum band is available for unlicensed use, such as Wi-Fi use. In some examples, the radio frequency spectrum band over which one or more other component carriers are carried may also be determined at block 1210. For example, it may be determined that the second uplink component carrier is transmitted over the shared radio frequency spectrum band, or that the second uplink component carrier is transmitted over a licensed radio frequency spectrum band. The licensed radio frequency spectrum band may include a radio frequency spectrum band for which transmitting apparatuses may not contend for access because the radio frequency spectrum band is licensed to specific users for specific uses, such as a licensed radio frequency spectrum band usable for LTE/LTE-A communications. The operation(s) at block 1210 may be performed using the wireless communication management component 620, 720, 860, or 1084 described with reference to FIG. 6, 7, 8, or 10, or the component carrier management component 635 or 735 described with reference to FIG. 6 or 7.

At block 1215, the method 1200 may include performing a power management operation on the first uplink component carrier, for a current subframe, based at least in part on the determining performed at block 1210. Performing the power management operation on the first uplink component carrier may include maintaining, on the first uplink component carrier and for the current subframe, a transmit power above a minimum guaranteed power. In some examples, performing the power management operation on the first uplink component carrier may include scaling the transmit power on the first uplink component carrier to a reduced power, but not below the minimum guaranteed power. In some examples, a power management operation may also be performed at block 1215 for one or more other component carriers in the plurality of component carriers. The operation(s) at block 1215 may be performed using the wireless communication management component 620, 720, 860, or 1084 described with reference to FIG. 6, 7, 8, or 10, the power management component 640 or 740 described with reference to FIG. 6 or 7, or the shared radio frequency spectrum band power management component 745, licensed radio frequency spectrum band power management component 750, and/or minimum guaranteed power management component 755 described with reference to FIG. 7.

In some examples, the minimum guaranteed power may be dependent on a channel type or uplink information type transmitted on the first uplink component carrier. For example, the minimum guaranteed power may include at least one of a PUCCH minimum guaranteed power component and a PUSCH guaranteed minimum power component, with the minimum guaranteed power at which the transmit power of the first uplink component carrier is maintained depending on whether a PUCCH and/or a PUSCH is scheduled to be transmitted on the first uplink component carrier during the current subframe. When a PUCCH is scheduled to be transmitted on the first uplink component carrier during the current subframe, the minimum guaranteed power may include the PUCCH minimum guaranteed power component. When a PUSCH is scheduled to be transmitted on the first uplink component carrier during the current subframe, the minimum guaranteed power may include the PUSCH minimum guaranteed power component. When a PUCCH and a PUSCH are scheduled to be transmitted on the first uplink component carrier during the current subframe, the minimum guaranteed power may include a combination and/or scaled percentage of the PUCCH minimum guaranteed power component and/or the PUSCH minimum guaranteed power component. In the case of scheduling both a PUCCH and a PUSCH on the first uplink component carrier during the current subframe, the minimum guaranteed power may also include a separately defined PUCCH/PUSCH minimum guaranteed power component.

When a power management operation is performed at block 1215 for one or more other component carriers in the plurality of component carriers, and when the one or more other component carriers include at least the second uplink component carrier, the same minimum guaranteed power or different minimum guaranteed powers may be maintained for the first uplink component carrier and the second uplink component carrier.

Thus, the method 1200 may provide for wireless communication. It should be noted that the method 1200 is just one implementation and that the operations of the method 1200 may be rearranged or otherwise modified such that other implementations are possible.

Figure 13:
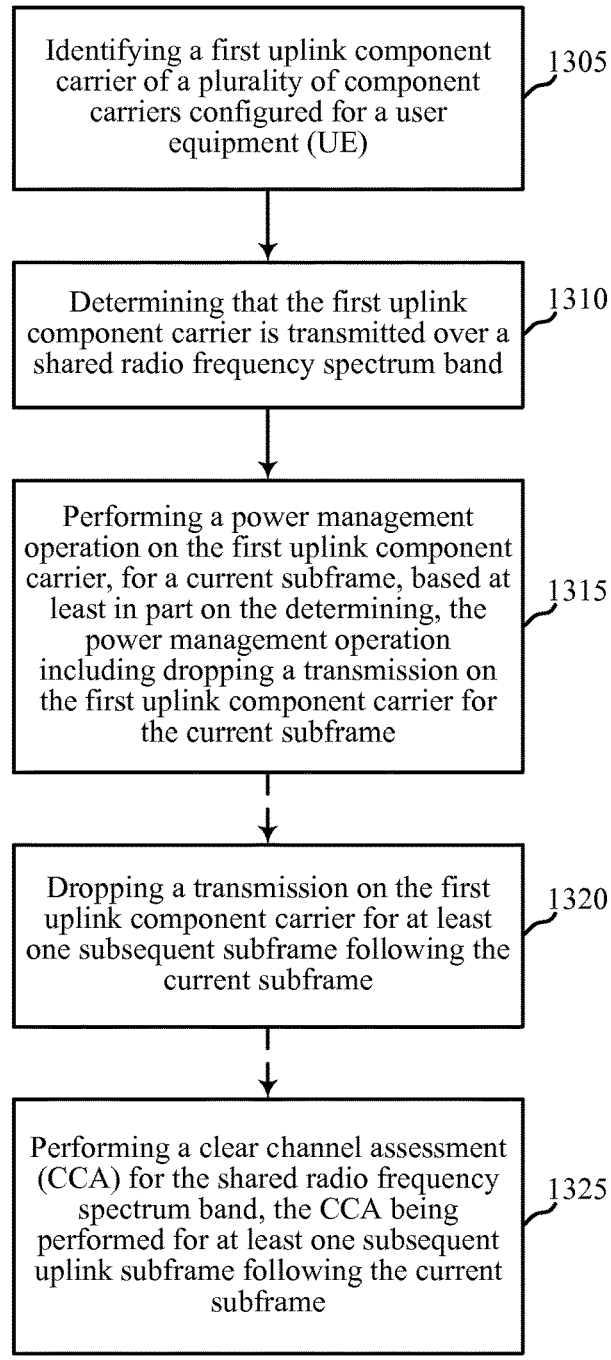
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the UEs 115, 215, 215-a, 215-b, 215-c, 315, 415, 815, or 1015 described with reference to FIG. 1, 2, 3, 4, 8, or 10, or aspects of one or more of the apparatuses 615 or 715 described with reference to FIG. 6 or 17. In some examples, a UE or apparatus may execute one or more sets of codes to control the functional elements of the UE or apparatus to perform the functions described below. Additionally or alternatively, the UE or apparatus may perform one or more of the functions described below using special-purpose hardware. The method 1300 presumes that a determination has been made to perform a power management operation for a current subframe (e.g., because the initial or default power settings for a plurality of component carriers configured for a UE or apparatus, for the current subframe, exceed an allowed total maximum transmit power for the UE or apparatus).

At block 1305, the method 1300 may include identifying a first uplink component carrier of a plurality of component carriers configured for a UE. In some examples, the plurality of component carriers may be configured for a carrier aggregation operation for the UE. In some examples, the plurality of component carriers may be configured for a dual-connectivity operation for the UE. In some examples, one or more additional component carriers of the plurality of component carriers may also be identified at block 1305. In some examples, the one or more additional component carriers may include at least a second uplink component carrier. The operation(s) at block 1305 may be performed using the wireless communication management component 620, 720, 860, or 1084 described with reference to FIG. 6, 7, 8, or 10, or the component carrier management component 635 or 735 described with reference to FIG. 6 or 7.

At block 1310, the method 1300 may include determining that the first uplink component carrier is transmitted over a shared radio frequency spectrum band. The shared radio frequency spectrum band may include a radio frequency spectrum band for which transmitting apparatuses may need to contend for access because the radio frequency spectrum band is available for unlicensed use, such as Wi-Fi use. In some examples, the radio frequency spectrum band over which one or more other component carriers are carried may also be determined at block 1310. For example, it may be determined that the second uplink component carrier is transmitted over the shared radio frequency spectrum band, or that the second uplink component carrier is transmitted over a licensed radio frequency spectrum band. The licensed radio frequency spectrum band may include a radio frequency spectrum band for which transmitting apparatuses may not contend for access because the radio frequency spectrum band is licensed to specific users for specific uses, such as a licensed radio frequency spectrum band usable for LTE/LTE-A communications. The operation(s) at block 1310 may be performed using the wireless communication management component 620, 720, 860, or 1084 described with reference to FIG. 6, 7, 8, or 10, or the component carrier management component 635 or 735 described with reference to FIG. 6 or 7.

At block 1315, the method 1300 may include performing a power management operation on the first uplink component carrier, for a current subframe, based at least in part on the determining performed at block 1310. Performing the power management operation on the first uplink component carrier may include dropping a transmission on the first uplink component carrier for the current subframe. In some examples, a power management operation may also be performed at block 1315 for one or more other component carriers in the plurality of component carriers. The operation(s) at block 1315 may be performed using the wireless communication management component 620, 720, 860, or 1084 described with reference to FIG. 6, 7, 8, or 10, the power management component 640 or 740 described with reference to FIG. 6 or 7, or the shared radio frequency spectrum band power management component 745, licensed radio frequency spectrum band power management component 750, and/or power scaling component 760 described with reference to FIG. 7.

At block 1320, the method 1300 may include dropping a transmission on the first uplink component carrier for at least one subsequent subframe following the current subframe. In some examples, the at least one subsequent subframe following the current subframe may include at least one uplink subframe between the current subframe and a boundary of a subsequent frame. In some examples, the at least one subsequent subframe following the current subframe may include each of a number of uplink subframes between the current subframe and the boundary of the subsequent frame. The operation(s) at block 1320 may be performed using the wireless communication management component 620, 720, 860, or 1084 described with reference to FIG. 6, 7, 8, or 10, the power management component 640 or 740 described with reference to FIG. 6 or 7, or the shared radio frequency spectrum band power management component 745 and/or power consistency management component 770 described with reference to FIG. 7.

At block 1325, the method 1300 may include performing a CCA for the shared radio frequency spectrum band. The CCA may be performed for at least one subsequent uplink subframe following the current subframe. In some examples, the CCA may take the form of an extended CCA. In some examples, the operation(s) at block 1325 may follow the operation(s) at block 1320. The operation(s) at block 1325 may be performed using the wireless communication management component 620, 720, 860, or 1084 described with reference to FIG. 6, 7, 8, or 10, the power management component 640 or 740 described with reference to FIG. 6 or 7, or the shared radio frequency spectrum band power management component 745 and/or power consistency management component 770 described with reference to FIG. 7.

Thus, the method 1300 may provide for wireless communication. It should be noted that the method 1300 is just one implementation and that the operations of the method 1300 may be rearranged or otherwise modified such that other implementations are possible.

Figure 14:
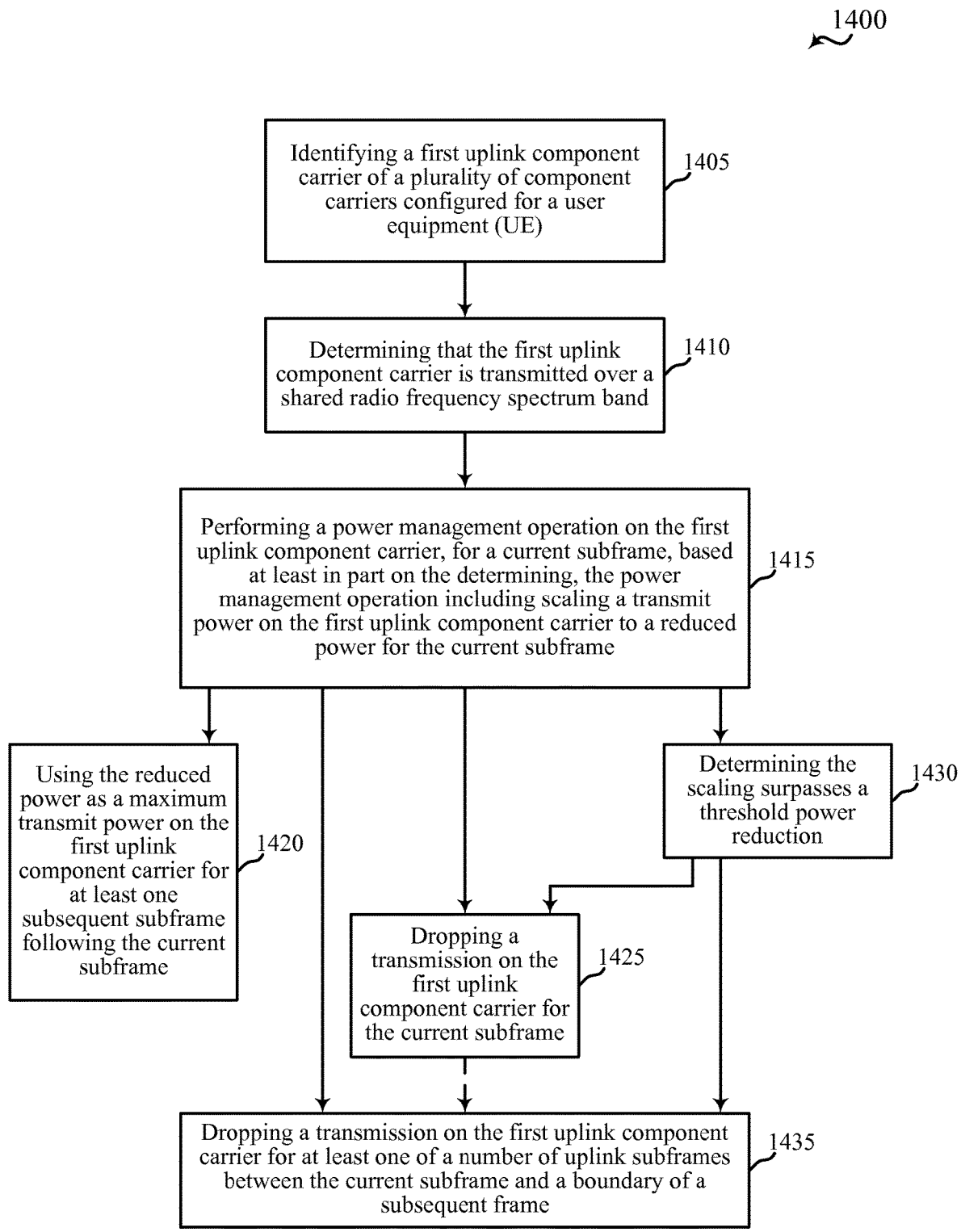
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the UEs 115, 215, 215-a, 215-b, 215-c, 315, 415, 815, or 1015 described with reference to FIG. 1, 2, 3, 4, 8, or 10, or aspects of one or more of the apparatuses 615 or 715 described with reference to FIG. 6 or 17. In some examples, a UE or apparatus may execute one or more sets of codes to control the functional elements of the UE or apparatus to perform the functions described below. Additionally or alternatively, the UE or apparatus may perform one or more of the functions described below using special-purpose hardware. The method 1400 presumes that a determination has been made to perform a power management operation for a current subframe (e.g., because the initial or default power settings for a plurality of component carriers configured for a UE or apparatus, for the current subframe, exceed an allowed total maximum transmit power for the UE or apparatus).

At block 1405, the method 1400 may include identifying a first uplink component carrier of a plurality of component carriers configured for a UE. In some examples, the plurality of component carriers may be configured for a carrier aggregation operation for the UE. In some examples, the plurality of component carriers may be configured for a dual-connectivity operation for the UE. In some examples, one or more additional component carriers of the plurality of component carriers may also be identified at block 1405. In some examples, the one or more additional component carriers may include at least a second uplink component carrier. The operation(s) at block 1405 may be performed using the wireless communication management component 620, 720, 860, or 1084 described with reference to FIG. 6, 7, 8, or 10, or the component carrier management component 635 or 735 described with reference to FIG. 6 or 7.

At block 1410, the method 1400 may include determining that the first uplink component carrier is transmitted over a shared radio frequency spectrum band. The shared radio frequency spectrum band may include a radio frequency spectrum band for which transmitting apparatuses may need to contend for access because the radio frequency spectrum band is available for unlicensed use, such as Wi-Fi use. In some examples, the radio frequency spectrum band over which one or more other component carriers are carried may also be determined at block 1410. For example, it may be determined that the second uplink component carrier is transmitted over the shared radio frequency spectrum band, or that the second uplink component carrier is transmitted over a licensed radio frequency spectrum band. The licensed radio frequency spectrum band may include a radio frequency spectrum band for which transmitting apparatuses may not contend for access because the radio frequency spectrum band is licensed to specific users for specific uses, such as a licensed radio frequency spectrum band usable for LTE/LTE-A communications. The operation(s) at block 1410 may be performed using the wireless communication management component 620, 720, 860, or 1084 described with reference to FIG. 6, 7, 8, or 10, or the component carrier management component 635 or 735 described with reference to FIG. 6 or 7.

At block 1415, the method 1400 may include performing a power management operation on the first uplink component carrier, for a current subframe, based at least in part on the determining performed at block 1410. Performing the power management operation on the first uplink component carrier may include scaling a transmit power on the first uplink component carrier to a reduced power for the current subframe. In some examples, a power management operation may also be performed at block 1415 for one or more other component carriers in the plurality of component carriers. The operation(s) at block 1415 may be performed using the wireless communication management component 620, 720, 860, or 1084 described with reference to FIG. 6, 7, 8, or 10, the power management component 640 or 740 described with reference to FIG. 6 or 7, or the shared radio frequency spectrum band power management component 745, licensed radio frequency spectrum band power management component 750, and/or power scaling component 760 described with reference to FIG. 7.

Following block 1415, the method 1400 may continue at block 1420, block 1425, block 1430, or block 1435.

At block 1420, the method 1400 may include using the reduced power as a maximum transmit power on the first uplink component carrier for at least one subsequent subframe following the current subframe. In some examples, the at least one subsequent subframe following the current subframe may include at least one uplink subframe between the current subframe and a boundary of a subsequent frame. In some examples, the at least one subsequent subframe following the current subframe may include each of a number of uplink subframes between the current subframe and the boundary of the subsequent frame. The operation(s) at block 1420 may be performed using the wireless communication management component 620, 720, 860, or 1084 described with reference to FIG. 6, 7, 8, or 10, the power management component 640 or 740 described with reference to FIG. 6 or 7, or the shared radio frequency spectrum band power management component 745 and/or power consistency management component 770 described with reference to FIG. 7.

At block 1425, the method 1400 may include dropping a transmission on the first uplink component carrier for the current subframe. In some examples, the operation(s) at block 1425 may be performed because a need to perform a power management operation exits (or because a need to scale the transmit power on the first uplink component carrier exists). In some examples, the operation(s) at block 1425 may be performed because it is determined at block 1430 that the scaling performed at block 1415 surpasses a threshold power reduction.

The operation(s) at block 1425 may be performed using the wireless communication management component 620, 720, 860, or 1084 described with reference to FIG. 6, 7, 8, or 10, the power management component 640 or 740 described with reference to FIG. 6 or 7, or the shared radio frequency spectrum band power management component 745, and/or power consistency management component 770 described with reference to FIG. 7. The operation(s) at block 1430 may be performed using the wireless communication management component 620, 720, 860, or 1084 described with reference to FIG. 6, 7, 8, or 10, the power management component 640 or 740 described with reference to FIG. 6 or 7, or the shared radio frequency spectrum band power management component 745 and/or threshold power reduction determination component 765 described with reference to FIG. 7.

At block 1435, the method 1400 may include dropping a transmission on the first uplink component carrier for at least one subsequent subframe following the current subframe. In some examples, the at least one subsequent subframe following the current subframe may include at least one uplink subframe between the current subframe and a boundary of a subsequent frame. In some examples, the at least one subsequent subframe following the current subframe may include each of a number of uplink subframes between the current subframe and the boundary of the subsequent frame.

In some examples, the operation(s) at block 1435 may be performed because the transmit power on the first uplink component carrier is scaled at block 1415. In some examples, the operation(s) at block 1435 may be performed because a transmission on the first uplink component carrier is dropped for the current subframe at block 1425. In some examples, the operation(s) at block 1435 may be performed because it is determined at block 1430 that the scaling performed at block 1415 surpasses a threshold power reduction.

The operation(s) at block 1435 may be performed using the wireless communication management component 620, 720, 860, or 1084 described with reference to FIG. 6, 7, 8, or 10, the power management component 640 or 740 described with reference to FIG. 6 or 7, or the shared radio frequency spectrum band power management component 745 and/or power consistency management component 770 described with reference to FIG. 7.

Thus, the method 1400 may provide for wireless communication. It should be noted that the method 1400 is just one implementation and that the operations of the method 1400 may be rearranged or otherwise modified such that other implementations are possible.

Figure 15:
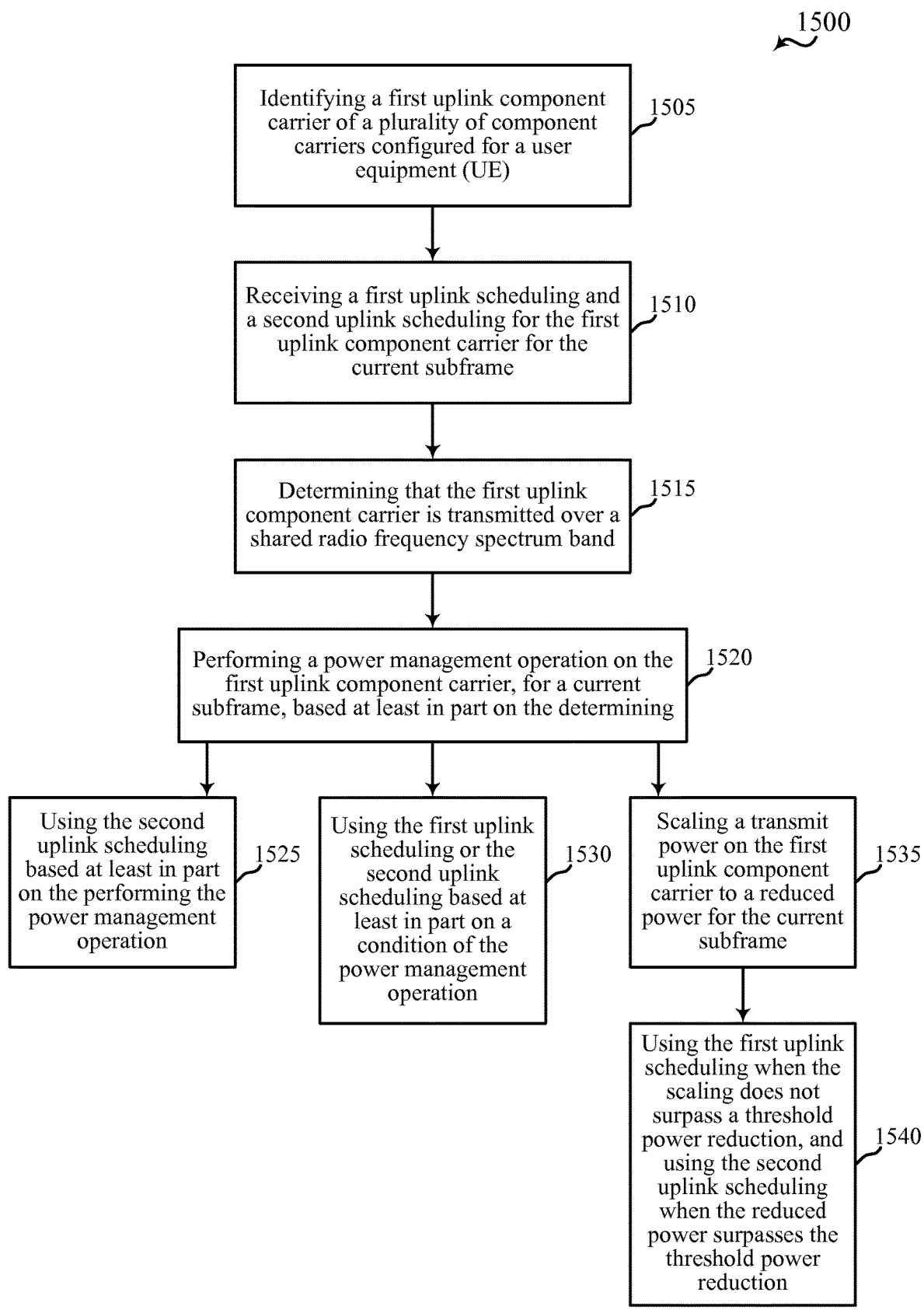
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115, 215, 215-a, 215-b, 215-c, 315, 415, 815, or 1015 described with reference to FIG. 1, 2, 3, 4, 8, or 10, or aspects of one or more of the apparatuses 615 or 715 described with reference to FIG. 6 or 17. In some examples, a UE or apparatus may execute one or more sets of codes to control the functional elements of the UE or apparatus to perform the functions described below. Additionally or alternatively, the UE or apparatus may perform one or more of the functions described below using special-purpose hardware. The method 1500 presumes that a determination has been made to perform a power management operation for a current subframe (e.g., because the initial or default power settings for a plurality of component carriers configured for a UE or apparatus, for the current subframe, exceed an allowed total maximum transmit power for the UE or apparatus).

At block 1505, the method 1500 may include identifying a first uplink component carrier of a plurality of component carriers configured for a UE. In some examples, the plurality of component carriers may be configured for a carrier aggregation operation for the UE. In some examples, the plurality of component carriers may be configured for a dual-connectivity operation for the UE. In some examples, one or more additional component carriers of the plurality of component carriers may also be identified at block 1505. In some examples, the one or more additional component carriers may include at least a second uplink component carrier. The operation(s) at block 1505 may be performed using the wireless communication management component 620, 720, 860, or 1084 described with reference to FIG. 6, 7, 8, or 10, or the component carrier management component 635 or 735 described with reference to FIG. 6 or 7.

At block 1510, the method 1500 may include receiving a first uplink scheduling for the first uplink component carrier for the current subframe, and receiving a second uplink scheduling for the first uplink component carrier for the current subframe. The operation(s) at block 1510 may be performed using the wireless communication management component 620, 720, 860, or 1084 described with reference to FIG. 6, 7, 8, or 10, or the uplink scheduling management component 775 described with reference to FIG. 7.

At block 1515, the method 1500 may include determining that the first uplink component carrier is transmitted over a shared radio frequency spectrum band. The shared radio frequency spectrum band may include a radio frequency spectrum band for which transmitting apparatuses may need to contend for access because the radio frequency spectrum band is available for unlicensed use, such as Wi-Fi use. In some examples, the radio frequency spectrum band over which one or more other component carriers are carried may also be determined at block 1515. For example, it may be determined that the second uplink component carrier is transmitted over the shared radio frequency spectrum band, or that the second uplink component carrier is transmitted over a licensed radio frequency spectrum band. The licensed radio frequency spectrum band may include a radio frequency spectrum band for which transmitting apparatuses may not contend for access because the radio frequency spectrum band is licensed to specific users for specific uses, such as a licensed radio frequency spectrum band usable for LTE/LTE-A communications. The operation(s) at block 1515 may be performed using the wireless communication management component 620, 720, 860, or 1084 described with reference to FIG. 6, 7, 8, or 10, or the component carrier management component 635 or 735 described with reference to FIG. 6 or 7.

At block 1520, the method 1500 may include performing a power management operation on the first uplink component carrier, for a current subframe, based at least in part on the determining performed at block 1515. In some examples, a power management operation may also be performed at block 1520 for one or more other component carriers in the plurality of component carriers. The operation(s) at block 1520 may be performed using the wireless communication management component 620, 720, 860, or 1084 described with reference to FIG. 6, 7, 8, or 10, the power management component 640 or 740 described with reference to FIG. 6 or 7, or the shared radio frequency spectrum band power management component 745 and/or licensed radio frequency spectrum band power management component 750 described with reference to FIG. 7.

Following block 1520, the method 1500 may continue at block 1525, block 1530, or block 1535.

At block 1525, the method 1500 may include using the second uplink scheduling, based at least in part on performing the power management operation. When the power management operation is not performed, the first uplink scheduling may be used. The operation(s) at block 1525 may be performed using the wireless communication management component 620, 720, 860, or 1084 described with reference to FIG. 6, 7, 8, or 10, or the uplink scheduling management component 775 described with reference to FIG. 7.

At block 1530, the method 1500 may include using the first uplink scheduling or the second uplink scheduling based at least in part on a condition of the power management operation. The operation(s) at block 1530 may be performed using the wireless communication management component 620, 720, 860, or 1084 described with reference to FIG. 6, 7, 8, or 10, or the uplink scheduling management component 775 described with reference to FIG. 7.

At block 1535, the method 1500 may include scaling the total transmit power on the first uplink component carrier to a reduced power for the current subframe. The operation(s) at block 1535 may be performed using the wireless communication management component 620, 720, 860, or 1084 described with reference to FIG. 6, 7, 8, or 10, the power management component 640 or 740 described with reference to FIG. 6 or 7, or the shared radio frequency spectrum band power management component 745 and/or power scaling component 760 described with reference to FIG. 7.

At block 1540, the method 1500 may include using the first uplink scheduling when the scaling does not surpass a threshold power reduction, and using the second uplink scheduling when the scaling surpasses the threshold power reduction. The operation(s) at block 1525 may be performed using the wireless communication management component 620, 720, 860, or 1084 described with reference to FIG. 6, 7, 8, or 10, or the uplink scheduling management component 775 described with reference to FIG. 7.

Thus, the method 1500 may provide for wireless communication. It should be noted that the method 1500 is just one implementation and that the operations of the method 1500 may be rearranged or otherwise modified such that other implementations are possible.

In some examples, aspects of one or more of the methods 1100, 1200, 1300, 1400, or 1500 described with reference to FIG. 11, 12, 13, 14, or 15 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
identifying a first uplink component carrier of a plurality of component carriers configured for a user equipment (UE);
determining that the first uplink component carrier is transmitted over an unlicensed radio frequency spectrum band, wherein one or more devices contend to access the unlicensed radio frequency spectrum band;
performing a transmit power management operation on the first uplink component carrier, for a current subframe, based at least in part on the determining that the first uplink component carrier is transmitted over the unlicensed radio frequency spectrum band, wherein the transmit power management operation includes reducing a transmit power of the current subframe of the first uplink component carrier; and
carrying over the transmit power management operation to at least one subsequent subframe following the current subframe, wherein carrying over the transmit power management operation includes using the reduced transmit power for the at least one subsequent subframe of the first uplink component carrier.

2. The method of claim 1, wherein performing the transmit power management operation comprises:
maintaining a transmit power on the first uplink component carrier at or above a minimum guaranteed power.

3. The method of claim 2, wherein the minimum guaranteed power depends on a channel type or uplink information type transmitted on the first uplink component carrier.

4. The method of claim 3, further comprising:
scheduling at least one of a physical uplink control channel (PUCCH) or a physical uplink shared channel (PUSCH) on the first uplink component carrier during the current subframe.

5. The method of claim 4, wherein the minimum guaranteed power comprises at least one of a PUCCH minimum guaranteed power component and a PUSCH minimum guaranteed power component, and wherein the PUCCH minimum guaranteed power component is greater than the PUSCH minimum guaranteed power component.

6. The method of claim 1, wherein the at least one subsequent subframe comprises at least one uplink subframe between the current subframe and a boundary of a subsequent frame.

7. The method of claim 1, further comprising:
dropping a transmission on the first uplink component carrier for at least one of a number of uplink subframes between the current subframe and a boundary of a subsequent frame.

8. The method of claim 1, wherein the reducing surpasses a threshold power reduction, the method further comprising:
dropping a transmission on the first uplink component carrier for at least one of a number of uplink subframes between the current subframe and a boundary of a subsequent frame.

9. The method of claim 1, wherein performing the transmit power management operation comprises:
dropping a transmission on the first uplink component carrier for the current subframe.

10. The method of claim 9, further comprising:
dropping a transmission on the first uplink component carrier for at least one of a number of uplink subframes between the current subframe and a boundary of a subsequent frame.

11. The method of claim 9, further comprising:
dropping a transmission on the first uplink component carrier for each of a number of uplink subframes between the current subframe and a boundary of a subsequent frame.

12. The method of claim 9, further comprising:
performing a clear channel assessment (CCA) for the unlicensed radio frequency spectrum band for at least one subsequent uplink subframe following the current subframe.

13. The method of claim 1, further comprising:
receiving a first uplink scheduling for the first uplink component carrier for the current subframe; and
receiving a second uplink scheduling for the first uplink component carrier for the current subframe.

14. The method of claim 13, further comprising:
using the second uplink scheduling based at least in part on performing the transmit power management operation.

15. The method of claim 13, further comprising:
using the first uplink scheduling or the second uplink scheduling based at least in part on a condition of the transmit power management operation.

16. The method of claim 13, wherein performing the transmit power management operation comprises:
using the first uplink scheduling when the reducing does not surpass a threshold power reduction; and
using the second uplink scheduling when the reducing surpasses the threshold power reduction.

17. The method of claim 1, wherein the plurality of component carriers comprises a second uplink component carrier transmitted over the unlicensed radio frequency spectrum band.

18. The method of claim 1, wherein the plurality of component carriers comprises a second uplink component carrier transmitted over a licensed radio frequency spectrum band.

19. The method of claim 1, wherein the plurality of component carriers is configured for a carrier aggregation operation for the UE.

20. The method of claim 1, wherein the plurality of component carriers is configured for a dual-connectivity operation for the UE.

21. An apparatus for wireless communication, comprising:
means for identifying a first uplink component carrier of a plurality of component carriers configured for a user equipment (UE);
means for determining that the first uplink component carrier is transmitted over an unlicensed radio frequency spectrum band, wherein one or more devices contend to access the unlicensed radio frequency spectrum band;
means for performing a transmit power management operation on the first uplink component carrier, for a current subframe, based at least in part on the determining that the first uplink component carrier is transmitted over the unlicensed radio frequency spectrum band, wherein the transmit power management operation includes reducing a transmit power of the current subframe of the first uplink component carrier; and means for carrying over the transmit power management operation to at least one subsequent subframe following the current subframe, wherein carrying over the transmit power management operation includes using the reduced transmit power for the at least one subsequent subframe of the first uplink component carrier.

22. An apparatus for wireless communication, comprising:

a processor;

memory in electronic communication with the processor; and the processor and the memory configured to:
identify a first uplink component carrier of a plurality of component carriers configured for a user equipment (UE);
determine that the first uplink component carrier is transmitted over an unlicensed radio frequency spectrum band, wherein one or more devices contend to access the unlicensed radio frequency spectrum band;
perform a transmit power management operation on the first uplink component carrier, for a current subframe, based at least in part on the determining that the first uplink component carrier is transmitted over the unlicensed radio frequency spectrum band, wherein the transmit power management operation includes reducing a transmit power of the current subframe of the first uplink component carrier; and
carry over the transmit power management operation to at least one subsequent subframe following the current subframe, wherein carrying over the transmit power management operation includes using the reduced transmit power for the at least one subsequent subframe of the first uplink component carrier.

23. The apparatus of claim 22, wherein the processor and the memory are configured to:
maintain a transmit power on the first uplink component carrier at or above a minimum guaranteed power.

24. The apparatus of claim 23, wherein the minimum guaranteed power depends on a channel type or uplink information type transmitted on the first uplink component carrier.

25. The apparatus of claim 22, wherein the at least one subsequent subframe comprises at least one uplink subframe between the current subframe and a boundary of a subsequent frame.

26. The apparatus of claim 22, wherein the reducing surpasses a threshold power reduction, the processor and memory further configured to:
drop a transmission on the first uplink component carrier for at least one of a number of uplink subframes between the current subframe and a boundary of a subsequent frame.

27. The apparatus of claim 22, wherein, for performing the transmit power management operation, the processor and memory are configured to:
drop a transmission on the first uplink component carrier for the current subframe.

28. The apparatus of claim 27, wherein the processor and memory are configured to:
drop a transmission on the first uplink component carrier for at least one of a number of uplink subframes between the current subframe and a boundary of a subsequent frame.

29. The apparatus of claim 27, wherein the processor and memory are configured to:
drop a transmission on the first uplink component carrier for each of a number of uplink subframes between the current subframe and a boundary of a subsequent frame.

30. A non-transitory computer-readable medium storing computer-executable code for wireless communication, the code executable by a processor to:
identify a first uplink component carrier of a plurality of component carriers configured for a user equipment (UE);
determine that the first uplink component carrier is transmitted over an unlicensed radio frequency spectrum band, wherein one or more devices contend to access the unlicensed radio frequency spectrum band;
perform a transmit power management operation on the first uplink component carrier, for a current subframe, based at least in part on the determining that the first uplink component carrier is transmitted over the unlicensed radio frequency spectrum band, wherein the transmit power management operation includes reducing a transmit power of the current subframe of the first uplink component carrier; and
carry over the transmit power management operation to a subsequent subframe following the current subframe, wherein carrying over the transmit power management operation includes using the reduced transmit power for the at least one subsequent subframe of the first uplink component carrier.

* * * * *